(12) United States Patent
Wang et al.

(10) Patent No.: US 11,228,505 B1
(45) Date of Patent: Jan. 18, 2022

(54) EXPLANATION OF GRAPH-BASED PREDICTIONS USING NETWORK MOTIF ANALYSIS

(71) Applicant: FUJITSU LIMITED, Kawasaki (JP)

(72) Inventors: Jun Wang, San Jose, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/248,560

(22) Filed: Jan. 29, 2021

(51) Int. Cl.
*G06F 15/16* (2006.01)
*H04L 12/24* (2006.01)
*G06N 7/00* (2006.01)
*G06K 9/62* (2006.01)

(52) U.S. Cl.
CPC .......... *H04L 41/16* (2013.01); *G06K 9/6262* (2013.01); *G06N 7/005* (2013.01); *H04L 41/12* (2013.01); *H04L 41/142* (2013.01)

(58) Field of Classification Search
CPC ....... H04L 41/16; H04L 41/142; H04L 41/12; H04L 41/0213; H04L 29/08072; H04L 29/06; H04L 41/22; H04L 43/00; H04L 12/2602; G06N 7/005; G06K 9/6262
See application file for complete search history.

(56) References Cited

U.S. PATENT DOCUMENTS

| 8,560,681 | B2 * | 10/2013 | Ramirez | H04L 67/22 709/224 |
| 2012/0290649 | A1 * | 11/2012 | Ramirez | H04W 4/21 709/204 |
| 2013/0073473 | A1 * | 3/2013 | Heath | G06Q 30/06 705/319 |
| 2018/0103052 | A1 * | 4/2018 | Choudhury | H04L 63/1416 |
| 2020/0160188 | A1 * | 5/2020 | Zhao | G06N 20/20 |
| 2020/0167694 | A1 * | 5/2020 | Pisner | G06F 16/9024 |
| 2020/0177466 | A1 * | 6/2020 | Rossi | G06N 20/00 |

OTHER PUBLICATIONS

Uri Alon, Network motifs: theory and experimental approaches, Nature Review Genetics, Jun. 2007, pp. 450-461, vol. 8, Nature Publishing Group (www.nature.comn/reviews/genetics).

(Continued)

*Primary Examiner* — Abdullahi E Salad
(74) *Attorney, Agent, or Firm* — Fujitsu Patent Center

(57) ABSTRACT

In an embodiment, operations including extracting a first set of sub-graphs from a first graph. A set of network motifs is extracted from the first graph based on first statistical information associated with the extracted first set of sub-graphs, and a set of network motif instances of the set of network motifs is located. Second statistical information of the set of network motifs is determined based on the set of network motif instances. The second statistical information includes network motif information of a node or edge associated with the set of network motif instances. A graph explanation model is applied on the first graph based on the second statistical information. A first explanation sub-graph for a first class is extracted from the first graph, based on the application of the graph explanation model and a set of regularization constraints. An output representation indicative of the first explanation sub-graph is displayed.

20 Claims, 16 Drawing Sheets

(56) References Cited

OTHER PUBLICATIONS

Wengong Jin, Regina Barzilay, and Toomi Jaakkola, Hierarchical Generation of Molecular Graphs using Structural Motifs, Apr. 18, 2020, 15 pages, arXiv:2002.03230v2 [cs.LG].

Wengong Jin, Regina Barzilay, and Toomi Jaakkola, Multi-Objective Molecule Generation using Interpretable Substructures, Jul. 2, 2020, 11 pages, arXiv:2002.03244v3 [cs.LG].

Chen Liang, Jiawei Luo, and Dan Song, Network simulation reveals significant contribution of network motifs to the age-dependency of yeast protein-protein interaction networks, Mol. BioSyst., 2014, pp. 2277-2288, vol. 10, The Royal Society of Chemistry.

R. Milo, S. Shenn-Orr, S. Itzkovitz, N. Kashtan, D. Chklovskii, and U. Alon, Network Motifs: Simple Building Blocks of Complex Networks, Science, Oct. 25, 2002, pp. 824-827, vol. 298.

Phillip E. Pope, Sohei Kolouri, Mohammad Rostami, Charles E. Martin, and Heiko Hoffman, Explainability Methods for Graph Convolutional Neural Networks, in 2019 IEEE/CVF Conference on Computer Vision and Pattern Recognition (CVPR), Jun. 2019, pp. 10764-10773, IEEE.

Jun Wang and Gregory Provan, On Motifs and Functional Modules in Complex Networks, Oct. 2009, 7 pages DOI: 10.1109/TIC-STH.2009.5444392, Source: IEEE Xplore.

Rex Ying, Dylan Bourgeois, Jiaxuan You, Marinka Zitnik, and Jure Leskovac, GNNExplainer: Generating Explanations for Graph Neural Networks, Nov. 13, 2019, 13 pages, arXiv:1903.03894v4 [cs.LG].

Bolei Zhou, Aditya Khosla, Agata Lapedriza, Aude Oliva, and Antonio Torralba, Learning Deep Features for Discriminative Localization, Dec. 14, 2015, 10 pages, arXiv:1512.04150v1 [cs.CV].

* cited by examiner

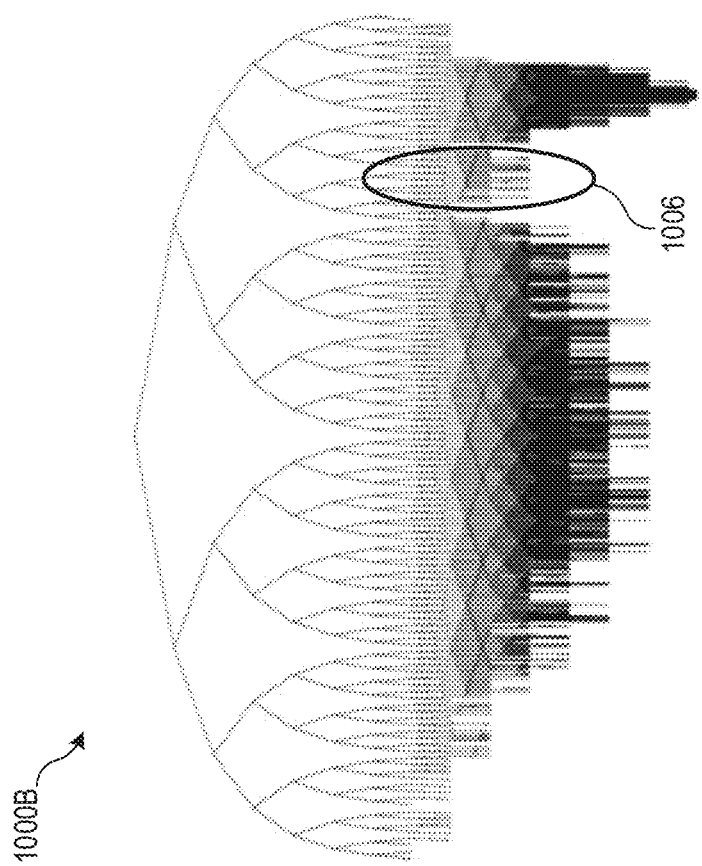
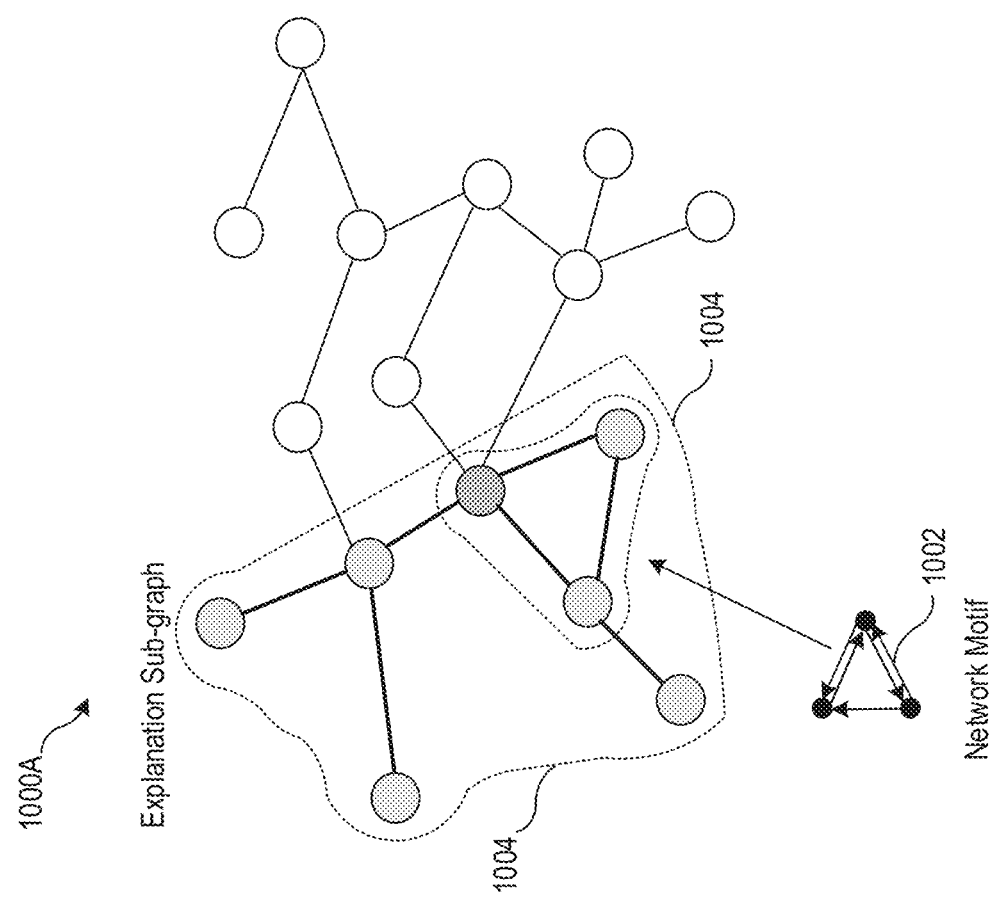
FIG. 10A
FIG. 10B

EXPLANATION OF GRAPH-BASED PREDICTIONS USING NETWORK MOTIF ANALYSIS

FIELD

The embodiments discussed in the present disclosure are related to explanation of graph-based predictions using network motif analysis.

BACKGROUND

Explainable Artificial Intelligence (XAI) is a technique that may explain why a machine learning model may assign certain prediction results to particular input data. To explain the machine learning model, the XAI technique may extract small sub-structures as explanation from the input data, such that the small sub-structures may still effectively determine prediction results associated with the machine learning model. Typically, XAI techniques may be applicable to the input data of image or text types. Though graph data may be more complex than simpler image data (e.g., a grid) or text data (e.g., a sequence), but explanation of graph-based prediction tasks may be important for a wide variety of application domains. Examples of such application domains may include, but are not limited to, biomedical domain (e.g., gene regulation, protein interaction, and drug structure), finance domain (e.g., loan/credit card application), social media and e-commerce domains (e.g., recommendations), and information technology domain (e.g., fault or attack analysis). Graph XAI is a technique that may explain why certain prediction results are assigned to an input graph by a Graph Neural Network (GNN) model or other graph-based machine learning models. To explain the GNN model or the other graph-based machine learning models, the Graph XAI technique may extract small sub-graphs from the input graph, such that the small sub-graph may still effectively determine prediction results associated with the GNN model or the other graph-based machine learning models. Typical Graph XAI techniques may extract and search for the explanation sub-graphs of the input graph based on just the individual nodes and edges of the input graph. This may involve traversal of a large search space in the graph, which may be an inefficient and time-consuming solution. Also, certain solutions may ignore connections between nodes, which may lead to inaccuracies in the explanation sub-graphs. Hence, there is a need for a solution for efficient and accurate extraction of explanation sub-graphs from the input graphs associated with graph-based prediction models (e.g., GNNs).

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations which may include extracting a first set of sub-graphs from a first graph based on a set of hyper-parameters. The operations may further include extracting a set of network motifs from the first graph based on first statistical information associated with the extracted first set of sub-graphs. The operations may further include locating a set of network motif instances of each of the extracted set of network motifs in the first graph. The operations may further include determining second statistical information associated with each of the extracted set of network motifs based on the located set of network motif instances. The second statistical information may include network motif information of a node or an edge associated with each of the located set of network motif instances. The operations may further include applying a graph explanation model on the first graph based on the determined second statistical information. The operations may further include extracting, from the first graph, a first explanation sub-graph for a first class associated with the first graph, based on the application of the graph explanation model and a set of regularization constraints. The operations may further include displaying an output representation indicative of the extracted first explanation sub-graph for the first class associated with the first graph.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 10A and 10B are diagrams that illustrate example first graphs from which explanation sub-graphs are extracted using network motif analysis;

DESCRIPTION OF EMBODIMENTS

Figure 1:
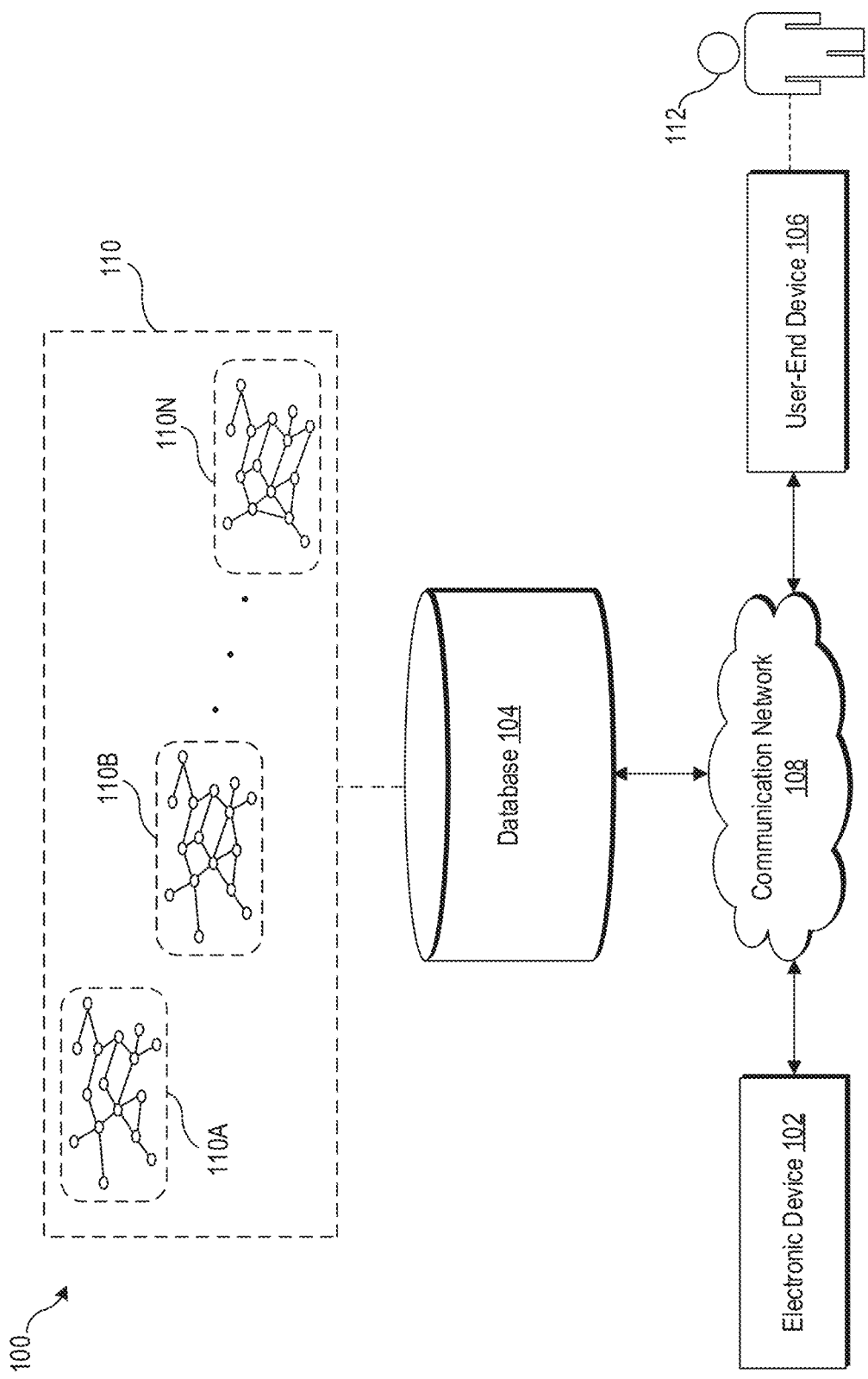
FIG. 1 is a diagram representing an example environment related to explanation of graph-based predictions using network motif analysis.

Some embodiments described in the present disclosure relate to methods and systems for explanation of graph-based predictions using network motif analysis. In the present disclosure, a first set of sub-graphs may be extracted from a first graph based on a set of hyper-parameters. A set of network motifs may then be extracted from the first graph based on first statistical information associated with the extracted first set of sub-graphs. A set of network motif instances of each of the extracted set of network motifs may be located in the first graph. Thereafter, second statistical information associated with each of the extracted set of network motifs may be determined based on the located set of network motif instances. The second statistical information may include network motif information of a node or an edge associated with each of the located set of network motif instances. Further, a graph explanation model may be applied on the first graph based on the determined second statistical information. Then, a first explanation sub-graph may be extracted from the first graph for a first class associated with the first graph. The extraction of the first explanation sub-graph may be based on the application of the graph explanation model and a set of regularization constraints. Further, an output representation that may be indicative of the extracted first explanation sub-graph for the first class associated with the first graph may be displayed.

According to one or more embodiments of the present disclosure, the technological field of explanation of graph-based predictions may be improved by configuring a computing system in a manner that the computing system may be able to efficiently and accurately extract explanation sub-graphs from input graphs. The computing system may use network motif information in the input graph to extract the explanation sub-graph, as compared to other conventional systems which may use only information associated nodes and edges in the input graph. The disclosed system may be advantageous as network motifs may be structural patterns in the graph that may be functional building blocks of the graph and may be exploited for determination of the explanation sub-graph. In certain scenarios, instances of network motifs may be used for reducing search space in the graph for extraction of the explanation sub-graph. For example, based on a higher correlation score of certain a network motif with a certain class associated with the graph, instances of the network motif in the graph may be used to seed the explanation sub-graph. As an example, sub-graphs in the graph that may overlap with such instances of the network motifs may be included in the explanation sub-graph. In another scenario, in case the extraction of the explanation sub-graph involves pruning of nodes and edges from the graph, the instances of the network motif with the higher correlation score with the particular class may not be pruned. Instead, such instances of the network motif may be included in the explanation sub-graph.

The system may be configured to extract a first set of sub-graphs from a first graph based on a set of hyper-parameters. In certain scenarios, based on a user-input, the system may select the set of hyper-parameters. The set of hyper-parameters may include at least one of, but not limited to, a maximum number of nodes in a network motif, a node type constraint associated with the network motif, a count threshold associated with the network motif, or a statistical significance threshold associated with the network motif. An example of the first graph is provided, for example, in FIG. 3A.

Figure 3A:
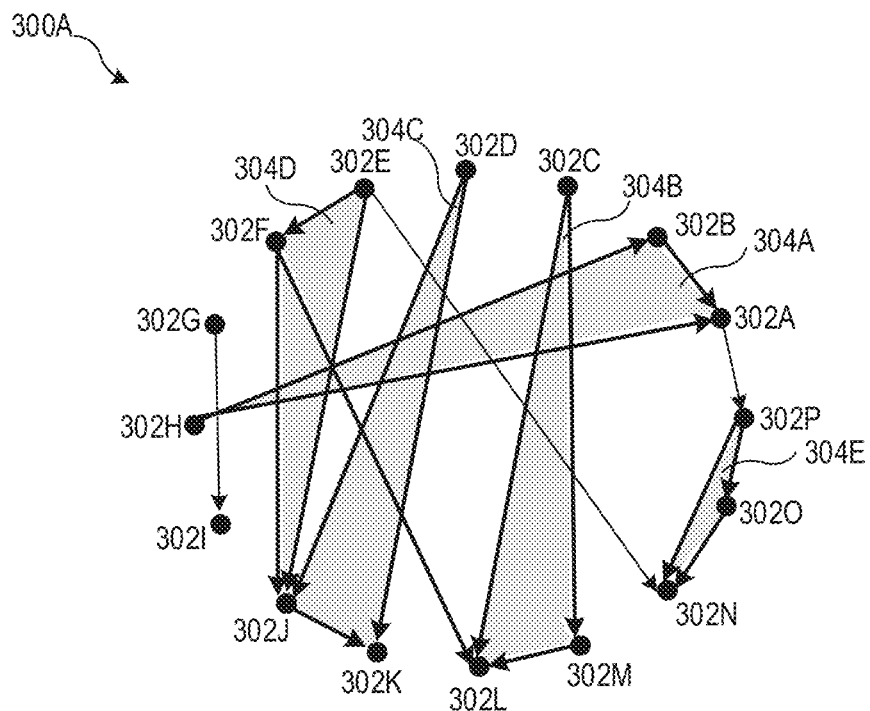
FIGS. 3A and 3B are diagrams that illustrate an example first graph and an example network motif in the example first graph, respectively.

The system may be configured to extract a set of network motifs from the first graph based on first statistical information associated with the extracted first set of sub-graphs. The system may determine the first statistical information associated with the extracted first set of sub-graphs based on a count of the first set of sub-graphs extracted from the first graph. Further, the system may extract a second set of sub-graphs from a random second graph. A size of the random second graph may be same as a size of the first graph. The system may determine third statistical information associated with the extracted second set of sub-graphs based on a count of the second set of sub-graphs extracted from the random second graph. The system may extract the set of network motifs from the first graph based on a comparison of the first statistical information and the third statistical information. A first network motif of the set of network motifs may be extracted from the first graph based on a condition including at least one of, but not limited to, a minimum count threshold for a network motif, or a statistical significance for a presence the network motif in the first graph as compared to a presence of the network motif in the random second graph. The condition may further include at least one of, but not limited to, a higher correlation score of the network motif for the first class associated with the first graph, or a similarity of the network motif to a pre-determined structure of a known network motif. The extraction of the set of network motifs is described further, for example, in FIGS. 6 and 7. An example of a network motif that may be extracted from the first graph of FIG. 3A is provided, for example, in FIG. 3B. An example of a random second graph is provided, for example, in FIG. 4. Examples of network motifs including three nodes each are provided, for example, in FIG. 5.

The system may be configured to locate a set of network motif instances of each of the extracted set of network motifs in the first graph. Further, the system may be configured to determine the second statistical information associated with each of the extracted set of network motifs based on the located set of network motif instances. The second statistical information may include network motif information of a node or an edge associated with each of the located set of network motif instances. The network motif information may include at least one of, but not limited to, a type of a network motif instance associated with the node or the edge associated with the network motif instance, or a position of the node or the edge in the network motif instance. The location of the set of network motif instances and the determination of the second statistical information are described further, for example, in FIG. 6.

The system may be configured to apply a graph explanation model on the first graph based on the determined second statistical information. Further, the system may be configured to extract, from the first graph, a first explanation sub-graph for a first class associated with the first graph, based on the application of the graph explanation model and a set of regularization constraints. The set of regularization constraints may include one or more of, but not limited to, a prediction score constraint, a size constraint, or a connectedness constraint. The application of the graph explanation model and the extraction of the first explanation sub-graph are described further, for example, in FIG. 6. In a scenario where a node type of a plurality of nodes in the first graph corresponds to a biological domain, the extraction of the first explanation sub-graph is described further, for example, in FIGS. 8, 9, 10A, 10B, 11, and 12. In a scenario where a node type of a plurality of nodes in the first graph corresponds to a social networking domain, the extraction of the first explanation sub-graph is described further, for example, in FIGS. 10A and 13. Another scenario where a node type of the plurality of nodes in the first graph corresponds to a social networking domain, the extraction of the first explanation sub-graph is described further, for example, in FIGS. 14, 15, and 10A. In a scenario where a node type of a plurality of nodes in the first graph corresponds to a molecular domain, the extraction of the first explanation sub-graph is described further, for example, in FIGS. 10B and 16.

The system may be configured to display an output representation indicative of the extracted first explanation sub-graph for the first class associated with the first graph. Examples of the output representation that may be indicative of the extracted first explanation sub-graph are provided, for example, in FIGS. 17A, 17B, 17C, 17D, and 17E.

Typically, conventional systems may not use basic functional building blocks of the input graph, such as network motifs, for extraction and search of an explanation sub-graph from an input graph. Conventional systems may extract and search for the explanation sub-graphs of the input graph based on just the individual nodes and edges of the input graph. This may involve traversal of a large search space in the graph, which may be an inefficient and time consuming solution. Also, certain solutions may ignore connections between nodes, which may lead to inaccuracies in the explanation sub-graphs. Thus, the conventional system may not provide accurate explanation sub-graphs, may be inefficient and time consuming. The disclosed system, on the other hand, exploits network motifs in the graph for determination of the explanation sub-graph. In certain scenarios, instances of network motifs may be used for reducing search space in the graph for extraction of the explanation sub-graph. For example, based on a higher correlation score of certain a network motif with a certain class associated with the graph, instances of the network motif in the graph may be used to extract the explanation sub-graph. Extraction of the explanation sub-graph based on such network motif instances may be a more accurate and efficient solution than convention solutions. In another scenario in case the extraction of the explanation sub-graph involves pruning of nodes and edges from the graph, the instances of the network motif with the higher correlation score with the particular class may not be pruned. Instead, such instances of the network motif may be included in the explanation sub-graph. Again, the search space in the graph that may be required to be explored to extract the explanation sub-graph may be reduced based on a location of such instances of the network motifs with a higher correlation score with respect to the target class of the graph. Further, the disclosed system may have a reasonable computational cost as compared to the conventional systems.

Embodiments of the present disclosure are explained with reference to the accompanying drawings.

FIG. 1 is a diagram representing an example environment related to explanation of graph-based predictions using network motif analysis, arranged in accordance with at least one embodiment described in the present disclosure. With reference to FIG. 1, there is shown an environment 100. The environment 100 may include an electronic device 102, a database 104, a user-end device 106, and a communication network 108. The electronic device 102, the database 104, and the user-end device 106 may be communicatively coupled to each other, via the communication network 108. In FIG. 1, there is further shown a set of graphs 110 including a first graph 110A, a second graph 110B, . . . and an Nth graph 110N. The set of graphs 110 may be stored in the database 104. There is further shown a user 112 who may be associated with or operating the electronic device 102 or the user-end device 106.

The electronic device 102 may include suitable logic, circuitry, interfaces, and/or code that may be configured to explain graph-based predictions using network motif analysis on a first graph, such as, the first graph 110A. The electronic device 102 may retrieve the first graph (e.g., the first graph 110A) from the database 104. The electronic device 102 may be configured to extract a first set of sub-graphs from the first graph 110A based on a set of hyper-parameters. In certain scenarios, based on a user-input, the electronic device 102 may select the set of hyper-parameters. The set of hyper-parameters may include at least one of, but not limited to, a maximum number of nodes in a network motif, a node type constraint associated with the network motif, a count threshold associated with the network motif, or a statistical significance threshold associated with the network motif. An example of the first graph 110 is provided, for example, in FIG. 3A.

The electronic device 102 may be configured to extract a set of network motifs from the first graph 110A based on first statistical information associated with the extracted first set of sub-graphs. The extraction of the set of network motifs is described further, for example, in FIGS. 6 and 7. An example of a network motif that may be extracted from the first graph of FIG. 3A is provided, for example, in FIG. 3B. Examples of network motifs including three nodes each are provided, for example, in FIG. 5.

The electronic device 102 may be configured to locate a set of network motif instances of each of the extracted set of network motifs in the first graph. Further, the electronic device 102 may be configured to determine second statistical information associated with each of the extracted set of network motifs based on the located set of network motif instances. The second statistical information may include network motif information of a node or an edge associated with each of the located set of network motif instances. The network motif information may include at least one of, but not limited to, a type of a network motif instance associated with the node or the edge associated with the network motif instance, or a position of the node or the edge in the network motif instance. The location of the set of network motif instances and the determination of the second statistical information are described further, for example, in FIG. 6.

The electronic device 102 may be configured to apply a graph explanation model on the first graph based on the determined second statistical information. Further, the electronic device 102 may be configured to extract, from the first graph, a first explanation sub-graph for a first class associated with the first graph, based on the application of the graph explanation model and a set of regularization constraints. The set of regularization constraints may include one or more of, but not limited to, a prediction score constraint, a size constraint, or a connectedness constraint. The application of the graph explanation model and the extraction of the first explanation sub-graph are described further, for example, in FIG. 6. In a scenario where a node type of a plurality of nodes in the first graph corresponds to a biological domain, the extraction of the first explanation sub-graph is described further, for example, in FIGS. 8, 9, 10A, 10B, 11, and 12. In a scenario where a node type of a plurality of nodes in the first graph corresponds to a social networking domain, the extraction of the first explanation sub-graph is described further, for example, in FIGS. 10 and 13. Another scenario where a node type of the plurality of nodes in the first graph corresponds to a social networking domain, the extraction of the first explanation sub-graph is described further, for example, in FIGS. 14, 15, and 10A. In a scenario where a node type of a plurality of nodes in the first graph corresponds to a molecular domain, the extraction of the first explanation sub-graph is described further, for example, in FIGS. 10B and 16.

The electronic device 102 may be configured to display an output representation indicative of the extracted first explanation sub-graph for the first class associated with the first graph. Examples of the output representation that may be indicative of the extracted first explanation sub-graph are provided in FIGS. 17A, 17B, 17C, 17D, and 17E.

Examples of the electronic device 102 may include, but are not limited to, a graph-processing device (e.g., a computing device with graph processors), a mobile device, a desktop computer, a laptop, a computer work-station, a computing device, a mainframe machine, a server, such as a cloud server, and a group of servers. In one or more embodiments, the electronic device 102 may include a user-end terminal device and a server communicatively coupled to the user-end terminal device. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

The database 104 may include suitable logic, interfaces, and/or code that may be configured to store the set of graphs 110. The database 104 may be a relational or a non-relational database. Also, in some cases, the database 104 may be stored on a server, such as a cloud server or may be cached and stored on the electronic device 102. The server of the database 104 may be configured to receive a request for a graph in the set of graphs 110 from the electronic device 102, via the communication network 108. In response, the server of the database 104 may be configured to retrieve and provide the requested graph to the electronic device 102 based on the received request, via the communication network 108. Additionally, or alternatively, the database 104 may be implemented using hardware including a processor, a microprocessor (e.g., to perform or control performance of one or more operations), a field-programmable gate array (FPGA), or an application-specific integrated circuit (ASIC). In some other instances, the database 104 may be implemented using a combination of hardware and software.

The user-end device 106 may include suitable logic, circuitry, interfaces, and/or code that may be configured to generate a graph (e.g., the first graph 110A) associated with an application domain. Examples of the application domain may include, but are not limited to, a biomedical domain, a social networking domain, a molecular domain, a financial domain, and a technology domain (e.g., IT technology). For example, the user-end device 106 may include a graph processing application to generate the graph. Alternatively, or additionally, the user-end device 106 may include a web-browser software or an electronic mail software, through which the user-end device 106 may receive the graph. The user-end device 106 may upload the generated or received graph to the electronic device 102 for extraction of the explanation sub-graph from the graph. In addition, the user-end device 106 may upload the generated or received graph to the database 104 for storage. The user-end device 106 may be further configured to receive information associated with the explanation sub-graph extracted from the graph from the electronic device 102. The user-end device 106 may display the output indicative of the explanation sub-graph extracted from the graph a display screen of the user-end device 106 for the user 112. Examples of the user-end device 106 may include, but are not limited to, a mobile device, a desktop computer, a laptop, a computer work-station, a computing device, a mainframe machine, a server, such as a cloud server, and a group of servers. Although in FIG. 1, the user-end device 106 is separated from the electronic device 102; however, in some embodiments, the user-end device 106 may be integrated in the electronic device 102, without a deviation from the scope of the disclosure.

The communication network 108 may include a communication medium through which the electronic device 102 may communicate with the server which may store the database 104, and the user-end device 106. Examples of the communication network 108 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 104 and the user-end device 106. In addition, in some embodiments, the functionality of each of the database 104 and the user-end device 106 may be incorporated into the electronic device 102, without a deviation from the scope of the disclosure.

Figure 2:
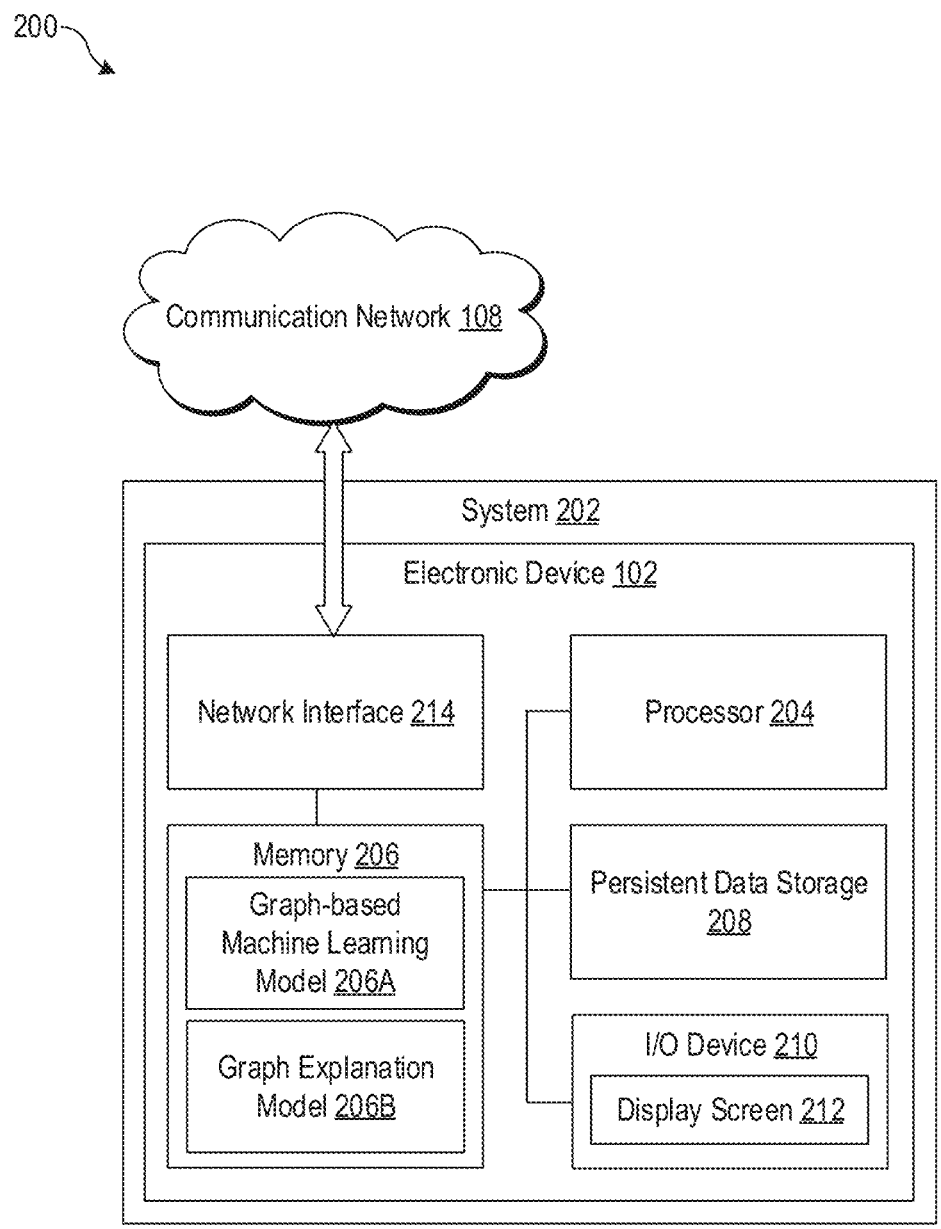
FIG. 2 is a block diagram that illustrates an exemplary electronic device for explanation of graph-based predictions using network motif analysis.

FIG. 2 is a block diagram that illustrates an exemplary electronic device for explanation of graph-based predictions using network motif analysis, arranged in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, a persistent data storage 208, an input/output (I/O) device 210, a display screen 212, and a network interface 214. The memory 206 may further include a graph-based machine learning model 206A and a graph explanation model 206B.

The processor 204 may include suitable logic, circuitry, and/or interfaces that may be configured to execute program instructions associated with different operations to be executed by the electronic device 102. For example, some of the operations may include extraction of the first set of sub-graphs, extraction of the set of network motifs, and locating the set of network motif instances of each of the extracted set of network motifs. The operations may further include determination of the second statistical information associated with each of the extracted set of network motifs, application of the graph explanation model on the first graph, extraction of the first explanation sub-graph from the first graph, and display of the output representation indicative of the extracted first explanation sub-graph. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a Graphics Processing Unit (GPU), a Central Processing Unit (CPU), a Reduced Instruction Set Computer (RISC) processor, an ASIC processor, a Complex Instruction Set Computer (CISC) processor, a co-processor, and/or a combination thereof.

The memory 206 may include suitable logic, circuitry, interfaces, and/or code that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may include suitable logic, circuitry, interfaces, and/or code that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or a special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may store a graph from the set of graphs 110 retrieved from the database 104. Either of the memory 206, the persistent data storage 208, or combination may further store information associated with the extracted first set of sub-graphs, the first statistical information, the extracted set of network motifs, the located set of network motifs, the second statistical information, the network motif information, the graph-based machine learning model 206A, the graph explanation model 206B, and the first explanation sub-graph.

In an example, the graph explanation model 206B may be a neural network model. The neural network model may be a computational network or a system of artificial neurons, arranged in a plurality of layers, as nodes. The plurality of layers of the neural network model may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model. Outputs of each hidden layer may be coupled to inputs of at least one node in other layers of the neural network model. Node(s) in the final layer may receive inputs from at least one hidden layer to output a result. The number of layers and the number of nodes in each layer may be determined from hyper-parameters of the neural network model. Such hyper-parameters may be set before or while training the neural network model on a training dataset.

Each node of the neural network model may correspond to a mathematical function (e.g., a sigmoid function or a rectified linear unit) with a set of parameters, tunable during training of the neural network model. The set of parameters may include, for example, a weight parameter, a regularization parameter, and the like. Each node may use the mathematical function to compute an output based on one or more inputs from nodes in other layer(s) (e.g., previous layer(s)) of the neural network model. All or some of the nodes of the neural network model may correspond to same or a different mathematical function.

In training of the neural network model, one or more parameters of each node of the neural network model may be updated based on whether an output of the final layer for a given input (from the training dataset) matches a correct result or not based on a loss function for the neural network model. The above process may be repeated for same or a different input till a minima of loss function may be achieved and a training error may be minimized. Several methods for training are known in art, for example, gradient descent, stochastic gradient descent, batch gradient descent, gradient boost, meta-heuristics, and the like.

The neural network model may include electronic data, such as, for example, a software program, code of the software program, libraries, applications, scripts, or other logic or instructions for execution by a processing device, such as the processor 204. The neural network model may include code and routines configured to enable a computing device including the processor 204 to perform one or more natural language processing tasks for analysis of a natural language text in a document. Additionally, or alternatively, the neural network model may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), CNN+ANN, a gated recurrent unit (GRU)-based RNN, a fully connected neural network, a deep Bayesian neural network, and/or a combination of such networks. In some embodiments, the neural network model may include numerical computation techniques using data flow graphs. In certain embodiments, the neural network model may be based on a hybrid architecture of multiple Deep Neural Networks (DNNs).

In an example, the graph-based machine learning model 206A may be a graph neural network (GNN) model. The GNN model may include suitable logic, circuitry, interfaces, and/or code that may configured to classify or analyze input graph data to generate an output result for a particular real-time application. For example, a trained GNN model may recognize different nodes in the input graph data, and edges between each node in the input graph data. The edges may correspond to different connections or relationship between each node in the input graph data. Based on the recognized nodes and edges, the trained GNN model may classify different nodes within the input graph data, into different labels or classes. In an example, a particular node of the input graph data may include a set of features associated therewith. Further, each edge may connect with different nodes having similar set of features. The electronic device 102 may be configured to encode the set of features to generate a feature vector using the GNN model. After the encoding, information may be passed between the particular node and the neighboring nodes connected through the edges. Based on the information passed to the neighboring nodes, a final vector may be generated for each node. Such final vector may include information associated with the set of features for the particular node as well as the neighboring nodes, thereby providing reliable and accurate information associated with the particular node. As a result, the GNN model may analyze the information represented as the input graph data. The GNN model may be implemented using hardware including a processor, a microprocessor (e.g., to perform or control performance of one or more operations), a field-programmable gate array (FPGA), or an application-specific integrated circuit (ASIC). In some other instances, the GNN model may be a code, a program, or set of software instruction. The GNN model may be implemented using a combination of hardware and software.

In some embodiments, the GNN model may correspond to multiple classification layers for classification of different nodes in the input graph data, where each successive layer may use an output of a previous layer as input. Each classification layer may be associated with a plurality of edges, each of which may be further associated with plurality of weights. During training, the GNN model may be configured to filter or remove the edges or the nodes based on the input graph data and further provide an output result (i.e. a graph representation) of the GNN model. Examples of the GNN model may include, but are not limited to, a graph convolution network (GCN), a Graph Spatial-Temporal Networks with GCN, a recurrent neural network (RNN), a deep Bayesian neural network, and/or a combination of such networks.

The I/O device 210 may include suitable logic, circuitry, interfaces, and/or code that may be configured to receive a user input. For example, the I/O device 210 may receive a user input to retrieve a graph from the database 104. In another example, the I/O device 210 may receive a user input to create a new graph, edit an existing document (such as, the retrieved graph), and/or store the created or edited graph. The I/O device 210 may further receive a user input that may include an instruction to extract an explanation sub-graph from the graph. The I/O device 210 may be further configured to provide an output in response to the user input. For example, the I/O device 210 may display an output representation indicative of the extracted explanation sub-graph on the display screen 212. The I/O device 210 may include various input and output devices, which may be configured to communicate with the processor 204 and other components, such as the network interface 214. Examples of the input devices may include, but are not limited to, a touch screen, a keyboard, a mouse, a joystick, and/or a microphone. Examples of the output devices may include, but are not limited to, a display (e.g., the display screen 212) and a speaker.

The display screen 212 may comprise suitable logic, circuitry, interfaces, and/or code that may be configured to display an output representation indicative of the extracted explanation sub-graph. The display screen 212 may be configured to receive the user input from the user 112. In such cases the display screen 212 may be a touch screen to receive the user input. The display screen 212 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 214 may comprise suitable logic, circuitry, interfaces, and/or code that may be configured to establish a communication between the electronic device 102, the database 104, and the user-end device 106, via the communication network 108. The network interface 214 may be implemented by use of various known technologies to support wired or wireless communication of the electronic device 102 via the communication network 108. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3B:
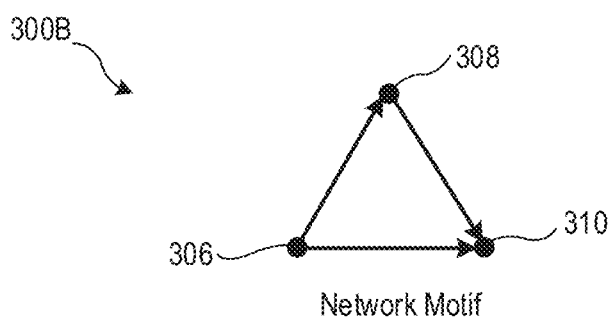

FIGS. 3A and 3B are diagrams that illustrate an example first graph and an example network motif in the example first graph, respectively, arranged in accordance with at least one embodiment described in the present disclosure. FIGS. 3A and 3B are explained in conjunction with elements from FIG. 1 and FIG. 2.

With reference to FIG. 3A, there is shown an example first graph 300A. In an example, the first graph 300A may include sixteen nodes. For example, the first graph 300A may include a first node 302A, a second node 302B, a third node 302C, a fourth node 302D, a fifth node 302E, a sixth node 302F, a seventh node 302G, and an eighth node 302H. The first graph 300A may further include a ninth node 302I, a tenth node 302J, an eleventh node 302K, a twelfth node 302L, a thirteenth node 302M, a fourteenth node 302N, a fifteenth node 302O, and a sixteenth node 302P. In an example, as shown in FIG. 3A, the first graph 300A may be a directed graph with directed edges between one or more pair of nodes in the first graph 300A. For example, the first graph 300A may include a directed edge from the second node 302B to the first node 302A. Similarly, the first graph 300A may include a directed edge from the seventh node 302G to the ninth node 302I.

With reference to FIG. 3B, there is shown an example first network motif 300B that may be present in the first graph 300A. As an example, the first network motif 300B may be a three nodes network motif that may correspond to a directed graph with directed edges between one or more pair of nodes in the directed graph. For example, as shown in FIG. 3B, the first network motif 300B may include a first node 306, a second node 308, and a third node 310. The first network motif 300B may include a first directed edge from the first node 306 to the second node 308, a second directed edge from the second node 308 to the third node 310, and a third directed edge from the first node 306 to the third node 310. In an example, the first network motif 300B may be a network motif that may represent a feedforward loop in a biological or technological domain.

With reference to FIG. 3A, in an example, the first graph 300A may include five instances of the first network motif 300B, such as, a first network motif instance 304A, a second network motif instance 304B, a third network motif instance 304C, a fourth network motif instance 304D, and a fifth network motif instance 304E. For example, the first network motif instance 304A may be an instance of the first network motif 300B that may include the first node 302A, the second node 302B, and the eighth node 302H in the first graph 300A. Further, the second network motif instance 304B may include the third node 302C, the twelfth node 302L, and the thirteenth node 302M. The third network motif instance 304C may include the fourth node 302D, the tenth node 302J, and the eleventh node 302K. Similarly, the fourth network motif instance 304D may include the fifth node 302E, the sixth node 302F, and the tenth node 302J, while the fifth network motif instance 304E may include the sixteenth node 302P, the fifteenth node 302O, and the fourteenth node 302N.

It may be noted that the first graph 300A and the first network motif 300B shown in FIGS. 3A and 3B are presented merely examples and should not be construed to limit the scope of the disclosure.

Figure 4:
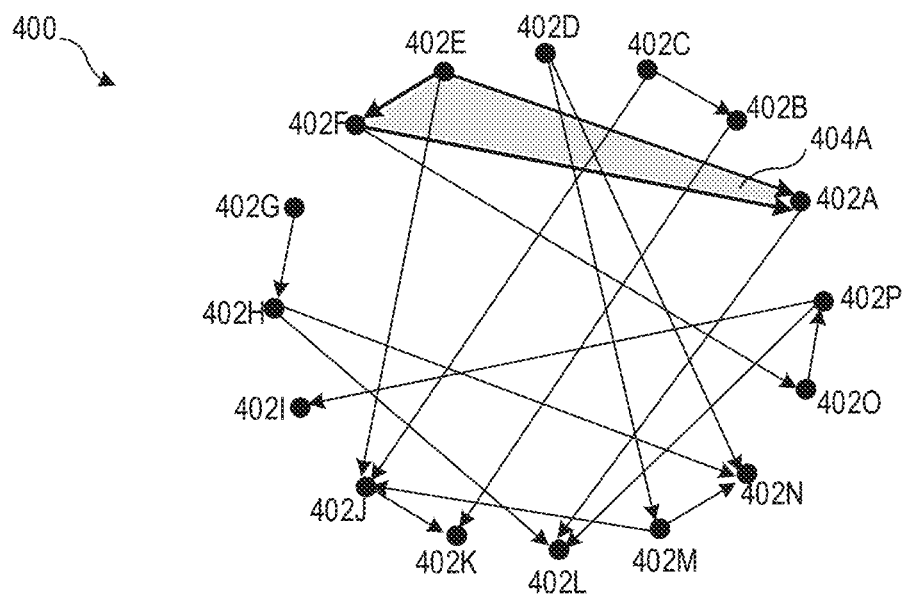
FIG. 4 is a diagram that illustrates an example random second graph of same size as the size of the example first graph of FIG. 3A.

FIG. 4 is a diagram that illustrates an example random second graph of same size as the size of the example first graph of FIG. 3A, arranged in accordance with at least one embodiment described in the present disclosure. FIG. 4 is explained in conjunction with elements from FIG. 1, FIG. 2, FIG. 3A and FIG. 3B.

With reference to FIG. 4, there is shown an example random second graph 400. The random second graph 400 may be of a same size as the size of the first graph 300A. In an example, the random second graph 400 may include sixteen nodes, which may be same as the number of nodes of the first graph 300A. For example, the random second graph 400 may include a first node 402A, a second node 402B, a third node 402C, a fourth node 402D, a fifth node 402E, a sixth node 402F, a seventh node 402G, and an eighth node 402H. The random second graph 400 may further include a ninth node 402I, a tenth node 402J, an eleventh node 402K, a twelfth node 402L, a thirteenth node 402M, a fourteenth node 402N, a fifteenth node 402O, and a sixteenth node 402P. In an example, as shown in FIG. 4, the random second graph 400 may be a directed graph with directed edges between one or more pair of nodes in the random second graph 400. For example, the random second graph 400 may include a directed edge from the second node 302B to the eleventh node 302K. Similarly, the random second graph 400 may include a directed edge from the sixth node 402F to the first node 402A.

The random second graph 400 may have a same single node characteristic as the first graph 300A. For example, a number of incoming edges and a number of outgoing edges associated with each node in the random second graph 400 may be same as the number of incoming edges and the number of outgoing edges associated with each corresponding node in the first graph 300A. The random second graph 400 may have random directional connectivity of edges between the nodes as compared to the first graph 300A, however, may have the same number of incoming and outgoing edges associated with each corresponding node. For example, the first node 302A of the first graph 300A may have one incoming edges each from the second node 302B and the eighth node 302H and may have one outgoing edge to the sixteenth node 302P. In the random second graph 400, the first node 402A corresponding to the first node 302A may have one incoming edge each from the fifth node 402E and the sixth node 402F and may have one outgoing edge to the twelfth node 402L.

In an example, the random second graph 400 may include one instances of the first network motif 300B, such as, a first network motif instance 404A. For example, the first network motif instance 304A may be an instance of the first network motif 300B that may include the first node 402A, the fifth node 402E, and the sixth node 402F in the random second graph 400. It may be noted that the random second graph 400 shown in FIG. 4 is presented merely as example and should not be construed to limit the scope of the disclosure.

Figure 5:
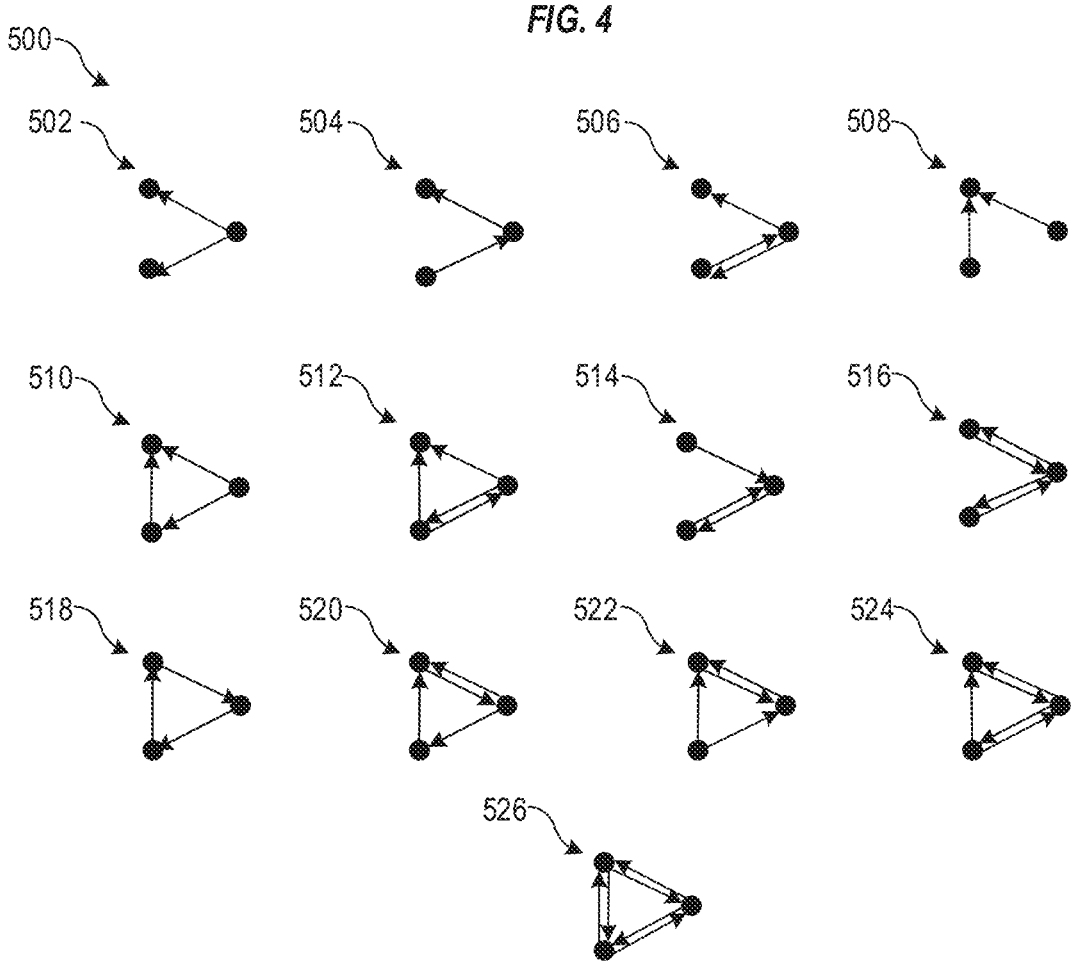
FIG. 5 is a diagram that illustrates a scenario including example network motifs of three nodes each.

FIG. 5 is a diagram that illustrates a scenario including example network motifs of three nodes each, arranged in accordance with at least one embodiment described in the present disclosure. FIG. 5 is explained in conjunction with elements from FIG. 1, FIG. 2, FIG. 3A, FIG. 3B, and FIG. 4.

With reference to FIG. 5, there is shown a scenario 500 including example network motifs of three node each. The example network motifs may correspond to a directed graph with directed edges between one or more pair of nodes in the directed graph. The example network motifs in the scenario 500 may include a first network motif 502, a second network motif 504, a third network motif 506, a fourth network motif 508, a fifth network motif 510, a sixth network motif 512, and a seventh network motif 514. The example network motifs in the scenario 500 may include an eighth network motif 516, a ninth network motif 518, a tenth network motif 520, an eleventh network motif 522, a twelfth network motif 524, and a thirteenth network motif 526. As an example, the ninth network motif 518 may be same as the first network motif 300B.

It may be noted that the scenario 500 shown in FIG. 5 is presented merely as example and should not be construed to limit the scope of the disclosure. Further, it may be noted that the scope of the disclosure should not be limited to the first graph 300A and the random second graph 400 as directed graphs. The first graph 300A and the random second graph 400 may be undirected graphs without departure from the scope of the disclosure. In such case, network motifs (e.g., the example network motifs of scenario 500) may be part of an undirected graph and may include undirected edges between one or more pairs of nodes in the undirected graph.

Figure 6:
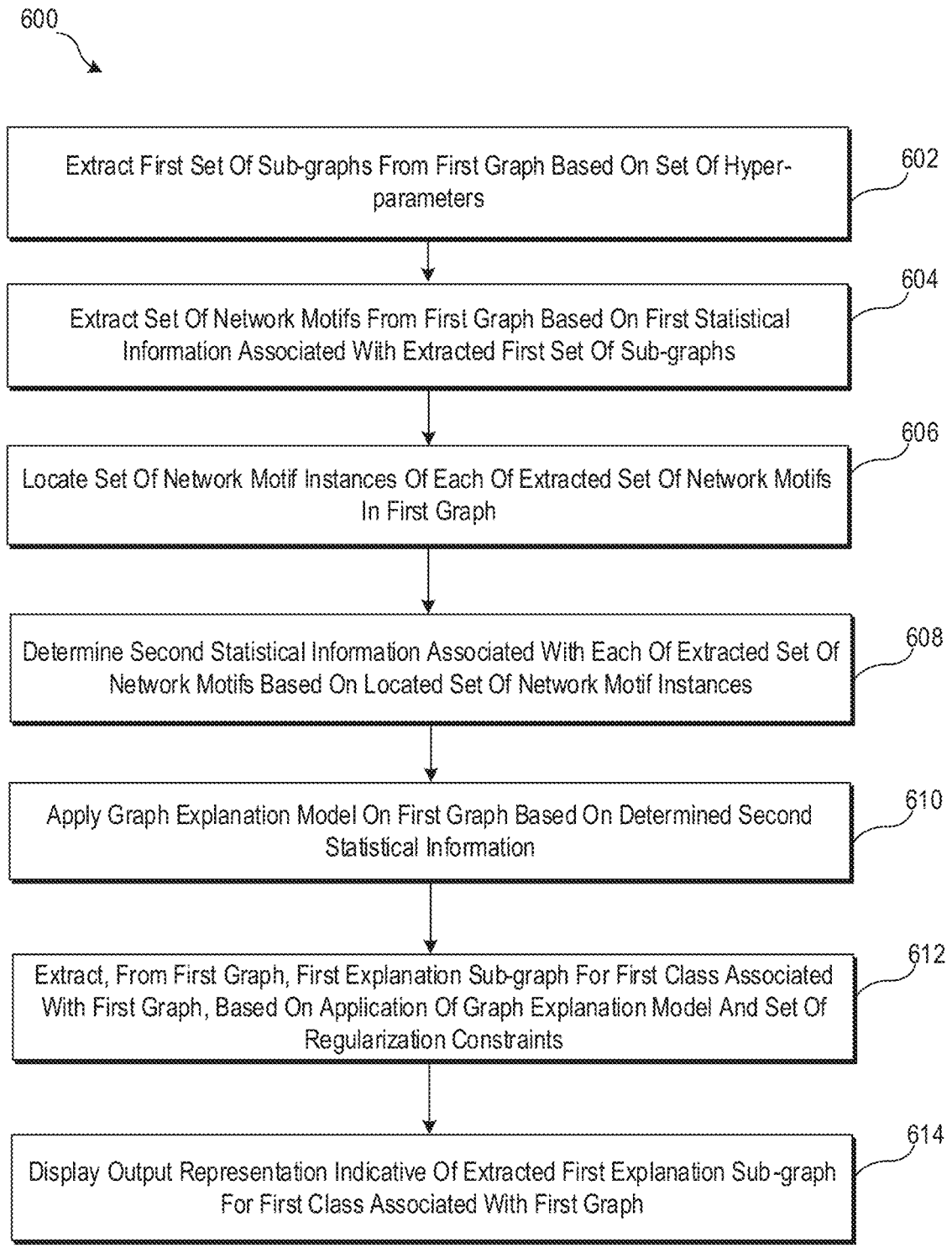
FIG. 6 is a diagram that illustrates a flowchart of an example method for explanation of graph-based predictions using network motif analysis.

FIG. 6 is a diagram that illustrates a flowchart of an example method for explanation of graph-based predictions using network motif analysis, arranged in accordance with at least one embodiment described in the present disclosure. FIG. 6 is explained in conjunction with elements from FIG. 1, FIG. 2, FIG. 3A, FIG. 3B, FIG. 4, and FIG. 5. With reference to FIG. 6, there is shown a flowchart 600. The method illustrated in the flowchart 600 may start at 602 and may be performed by any suitable system, apparatus, or device, such as by the example electronic device 102 of FIG. 1 or processor 204 of FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, a first set of sub-graphs may be extracted from a first graph (e.g., the first graph 300A) based on a set of hyper-parameters. In an embodiment, the processor 204 may be configured to extract the first set of sub-graphs from the first graph 300A based on the set of hyper-parameters. In an embodiment, the processor 204 may be configured to select the set of hyper-parameters based on a user-input. Examples of the set of hyper-parameters may include at least one of, but not limited to, a maximum number of nodes in a network motif, a node type constraint associated with the network motif, a count threshold associated with the network motif, or a statistical significance threshold associated with the network motif. In an example, if the maximum number of nodes in the network motifs is four, the processor 204 may extract all possible sub-graphs from the first graph 300A with a maximum of four nodes. As an example, the processor 204 may extract a sub-graph of two nodes, such as, a first sub-graph including the nodes 302G and 302I, as the first set of sub-graphs. Further, the processor 204 may extract a sub-graph of three nodes (such as, a second sub-graph including the nodes 302H, 302B and 302A, as the first set of sub-graphs), and may extract a sub-graph of four nodes (such as a third sub-graph including the nodes 302H, 302B, 302A, and 302P, as the first set of sub-graphs). In another example, if the count threshold associated with the network motif is three, the processor 204 may extract all sub-graphs with three connected nodes each, such as, a sub-graph including the nodes 302E, 302F, and 302J and a sub-graph including the nodes 302P, 302O, and 302N. In another example, the processor 204 may extract sub-graphs from the first graph 300A based on whether the nodes in the sub-graphs are of a certain node type, such as, a biomedical node type, a social networking node type, a molecular node type, a financial node type, and a technology (e.g., information technology) node type.

At block 604, a set of network motifs may be extracted from the first graph 300A based on first statistical information associated with the extracted first set of sub-graphs. In an embodiment, the processor 204 may be configured to extract the set of network motifs from the first graph 300A based on the first statistical information associated with the extracted first set of sub-graphs. The first statistical information may include, but is not limited to, a minimum count of sub-graphs associated with a network motif, a count of sub-graphs associated with the network motif, a count of sub-graphs associated with a class associated with the first graph 300A, or an average count of sub-graphs in each class associated with the first graph 300A. In an example, the processor 204 may extract the first network motif 300B as the set of network motifs from the first graph 300A. The extraction of the set of network motifs is described further, for example, in FIG. 7.

At block 606, a set of network motif instances of each of the extracted set of network motifs may be located in the first graph 300A. In an embodiment, the processor 204 may be configured to locate the set of network motif instances of each of the extracted set of network motifs in the first graph 300A. In an embodiment, the processor 204 may search in the whole first graph 300A to locate the set of network motif instances in case the graph-based prediction corresponds to a graph-classification task. In another embodiment, the processor 204 may search nodes connected to a target node in the first graph 300A to locate the network motif instances in case the graph-based prediction corresponds to a node classification task. In yet another embodiment, the processor 204 may search links or edges connected to target links or edges (or associated nodes) in the first graph 300A to locate the network motif instances in case the graph-based prediction corresponds to a link-prediction task. As an example, the processor 204 may locate the five instances of the first network motif 300B in the first graph 300A. Examples of the located five instances of the first network motif 300B may include the first network motif instance 304A, the second network motif instance 304B, the third network motif instance 304C, the fourth network motif instance 304D, and the fifth network motif instance 304E.

At block 608, second statistical information associated with each of the extracted set of network motifs may be determined based on the located set of network motif instances. In an embodiment, the processor 204 may be configured to determine the second statistical information associated with each of the extracted set of network motifs. The second statistical information may include network motif information of a node or an edge associated with each of the located set of network motif instances. Examples of the network motif information may include, but are not limited to, a type of a network motif instance associated with the node or the edge associated with the network motif instance, or a position of the node or the edge in the network motif instance. In an example, the first network motif instance 304A may be a network motif instance of a feed-forward loop types associated with a biological or technological domain. The directed edge between the second node 302B and the first node 302A may be an edge at a second position in the first network motif instance 304A. The second statistical information may further include, but is not limited to, a minimum count of network motif instances of a network motif, a count of network motif instances of the network motif, a count of network motif instances associated with a class associated with the first graph 300A, or an average count of network motif instances in each class associated with the first graph 300A.

At block 610, the graph explanation model 206B may be applied on the first graph 300A based on the determined second statistical information. In an embodiment, the processor 204 may be configured to apply the graph explanation model 206B on the first graph 300A based on the determined second statistical information. As an example, the graph explanation model 206B may be a neural network model. The application of the graph explanation model 206B on the first graph 300A is described further, for example, in FIGS. 8, 9, 11, 13, 14, 15, and 16.

At block 612, a first explanation sub-graph may be extracted from the first graph 300A for a first class associated with the first graph 300A. In an embodiment, the processor 204 may be configured to extract the first explanation sub-graph for the first class associated with the first graph 300A. The extraction of the first explanation sub-graph may be based on the application of the graph explanation model 206B and a set of regularization constraints. Examples of the set of regularization constraints may include one or more of, but not limited to, a prediction score constraint, a size constraint, or a connectedness constraint. In an embodiment, the set of regularization constraints may increase a likelihood of an inclusion of a sub-graph in the first explanation sub-graph. Herein, the sub-graph may include one or more overlapped network motifs whose correlation score for the first class exceeds a threshold. The sub-graph may be included in the first explanation sub-graph based on an average correlation score of a set of edges in the sub-graph for the first class. Further, a correlation score of an edge may be based on a correlation score of a network motif for the first class. In case of a biological domain, examples of the first class may include, but is not limited to, types of proteins or DNA sequences of organisms. In case of a social network domain, examples of the first class may include, but is not limited to, types of social connectivity or acquaintance between different individuals. In case of a molecular domain, examples of the first class may include, but is not limited to, types of molecules or chemical compounds. The extraction of the first explanation sub-graph from the first graph 300A is described further, for example, in FIGS. 8, 9, 11, 13, 14, 15, and 16.

At block 614, an output representation indicative of the extracted first explanation sub-graph may be displayed. In an embodiment, the processor 204 may be configured to display the output representation indicative of the extracted first explanation sub-graph. The extracted first explanation sub-graph may be associated with the first class associated with the first graph 300A. Examples of the output representation are provided, for example, in FIGS. 17A, 17B, 17C, 17D, and 17E. Control may pass to end.

Although the flowchart 600 is illustrated as discrete operations, such as 602, 604, 606, 608, 610, 612, and 614. However, in certain embodiments, such discrete operations may be further divided into additional operations, combined into fewer operations, or eliminated, depending on the particular implementation without detracting from the essence of the disclosed embodiments.

Figure 7:
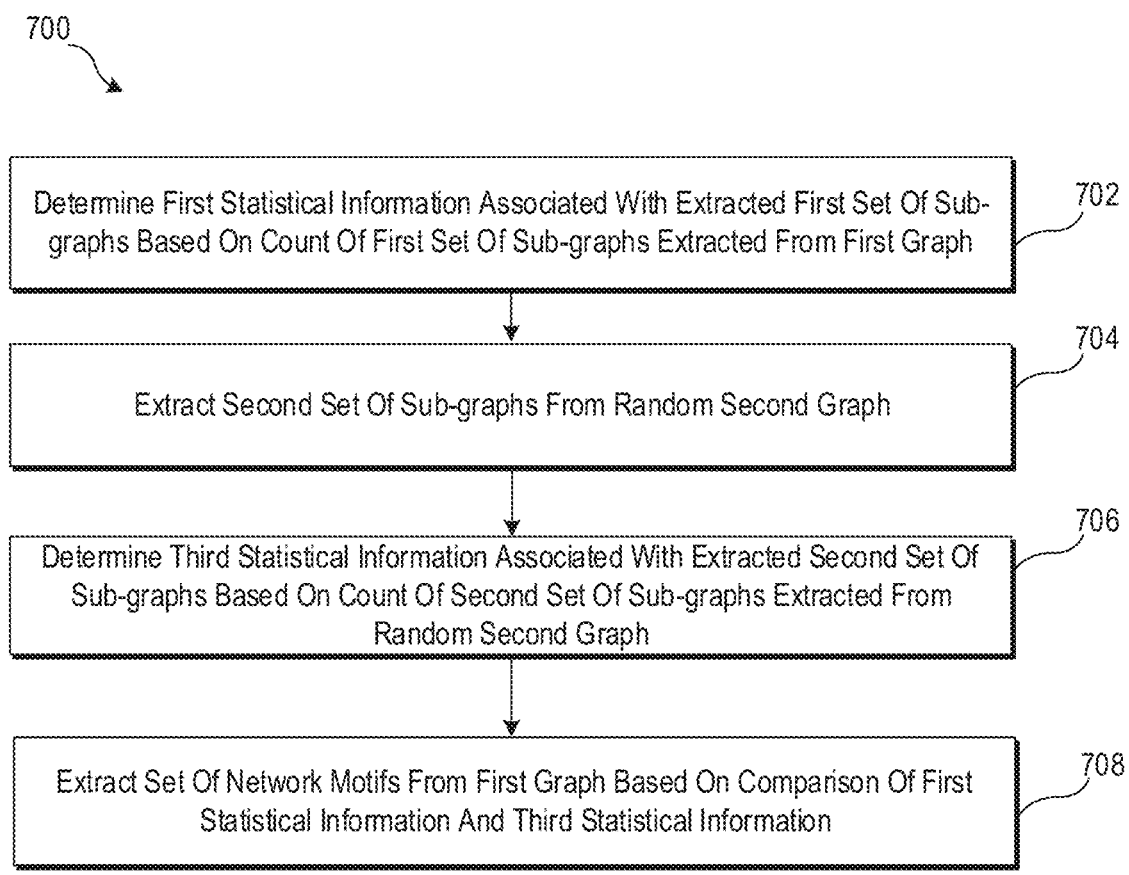
FIG. 7 is a diagram that illustrates a flowchart of an example method for extraction of a set of network motifs from a graph.

FIG. 7 is a diagram that illustrates a flowchart of an example method for extraction of a set of network motifs from a graph, arranged in accordance with at least one embodiment described in the present disclosure. FIG. 7 is explained in conjunction with elements from FIG. 1, FIG. 2, FIG. 3A, FIG. 3B, FIG. 4, FIG. 5, and FIG. 6. With reference to FIG. 7, there is shown a flowchart 700. The method illustrated in the flowchart 700 may start at 702 and may be performed by any suitable system, apparatus, or device, such as by the example electronic device 102 of FIG. 1 or processor 204 of FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, the first statistical information associated with the extracted first set of sub-graphs may be determined based on a count of the first set of sub-graphs extracted from the first graph 300A. In an embodiment, the processor 204 may be configured to determine the first statistical information associated with the extracted first set of sub-graphs. The first statistical information may be determined based on the count of the first set of sub-graphs extracted from the first graph 300A. The first statistical information associated with the first set of sub-graphs may include, but is not limited to, a minimum count of sub-graphs associated with a network motif, a count of sub-graphs associated with the network motif, a count of sub-graphs associated with a class associated with the first graph 300A, or an average count of sub-graphs in each class associated with the first graph 300A.

At block 704, a second set of sub-graphs may be extracted from the random second graph 400. In an embodiment, the processor 204 may be configured to extract the second set of sub-graphs from the random second graph 400. In an embodiment, the random second graph 400 (shown in FIG. 4) may be of the same size as the first graph 300A and may have the same single node characteristics as the first graph 300A. For example, each of the random second graph 400 and the first graph 300A may have the same number of nodes (e.g., 16). Further, the number of incoming edges and the number of outgoing edges at each node in the random second graph 400 may be same as the number of incoming edges and the number of outgoing edges at each corresponding node of the first graph 300A. The extraction of the second set of sub-graphs from the random second graph 400 may be based on the set of hyper-parameters. The processor 204 may extract the second set of sub-graphs from the random second graph 400 similar to the extraction of the first set of sub-graphs from the first graphs 300A, as described, for example, in FIG. 6 (at block 602).

At block 706, the third statistical information associated with the extracted second set of sub-graphs may be determined based on a count of the second set of sub-graphs extracted from the random second graph 400. In an embodiment, the processor 204 may be configured to determine the third statistical information associated with the extracted second set of sub-graphs. The third statistical information may be determined based on the count of the second set of sub-graphs extracted from the random second graph 400. The third statistical information associated with the second set of sub-graphs may include, but is not limited to, a minimum count of sub-graphs associated with a network motif, a count of sub-graphs associated with the network motif, a count of sub-graphs associated with a class associated with the random second graph 400, or an average count of sub-graphs in each class associated with the random second graph 400.

At block 708, the set of network motifs may be extracted from the first graph 300A based on a comparison of the first statistical information and the third statistical information. In an embodiment, the processor 204 may be configured to extract the set of network motifs from the first graph 300A based on the comparison of the first statistical information and the third statistical information. In an embodiment, first network motif of the set of network motifs may extracted from the first graph based on a condition that may include at least one of, but not limited to, a minimum count threshold for a network motif, or a statistical significance for a presence the network motif in the first graph 300A as compared to a presence of the network motif in the random second graph 400. The condition may further include at least one of, but not limited to, a higher correlation score of the network motif for the first class associated with the first graph 300A, or a similarity of the network motif to a pre-determined structure of a known network motif.

For example, the processor 204 may compare a first count of the sub-graphs from the first set of sub-graphs, which may be associated with a network motif, with a second count of the sub-graphs from the second set of sub-graphs, which may be associated with the same network motif. In case the first count is determined as greater than the second count, the processor 204 may extract the particular network motif from the first graph 300A. Alternatively, if the first count is greater than a minimum count threshold, the processor 204 may extract the network motif from the first graph 300A. As an example, the first count of the sub-graphs associated with the first network motif 300B in the first graph 300A may be five, while the second count of the sub-graphs associated with the same first network motif 300B in the random second graph 400 may be one. Thus, in such case, the processor 204 may extract the first network motif 300B from the first graph 300A.

In another example, the processor 204 may determine a statistical significance for a presence a network motif in the first graph 300A as compared to a presence of the network motif in the random second graph 400. The processor 204 may determine the statistical significance based on the following equation (1):

$$\text{Statistical Significance} = \frac{\text{Count}(G1) - \text{Count}(G2)}{\text{Standard Deviation}(\text{Count}(G2))} \quad (1)$$

where,
G1 may represent the first graph 300A;
G2 may represent the random second graph 400;
Count(.) may represent a count of sub-graphs in a graph; and
Standard Deviation (.) may represent a standard deviation of values (e.g., a count of sub-graphs).

The processor 204 may extract the network motif from the first graph 300A in case the statistical significance for the presence of the network motif in the first graph 300A as compared to the presence of the network motif in the random second graph 400 is greater than a threshold. In an embodiment, the network motif may be extracted from the first graph 300A if a probability (P) of occurrence of the network motif in the random second graph 400 (in an equal or greater number of instances) than an occurrence of the network motif in the first graph 300A is lower than a cutoff (e.g., P=0.01). In such case, the presence of the network motif in the first graph 300A may be statistically significant than the presence of the network motif in the random second graph 400.

In another example, the processor 204 may determine a correlation score of a network motif for the first class associated with the first graph 300A, based on a graph-based prediction task executed on the first graph 300A. In case the correlation score of the network motif for the first class is determined to be higher than a threshold, the processor 204 may extract the network motif from the first graph 300A. The processor 204 may determine the correlation score of the network motif for the first class by use of the following equation (2):

$$\text{Correlation score with first class,} \quad (2)$$
$$C1 = \frac{\text{Count}(C1) - \text{Average Count in All Classes}}{\text{Average Count in All Classes}}$$

where, C1 may represent the first class; Count(.) may represent a count of network motif instances of a network motif associated with a class; and Average Count in All Classes may represent an average value of count of network motif instances of a network motif associated with each class.

In another example, first information associated with a set of pre-determined structures of a known network motifs may be stored in the memory 206 or the persistent data storage 208. The processor 204 may extract the first information associated with the set of pre-determined structure of the known network motifs from the memory 206 or the persistent data storage 208. The processor 204 may extract a network motif from the first graph 300A based on the comparison of a structure of the network motif with the set of pre-determined structures of the known network motifs based on the extracted first information. As an example, for certain graph data sets, such as, biological networks, pre-determined network motifs may be well known as functional building blocks (such as, in case of gene regulation networks). For example, the first network motif 300B may correspond to a feed-forward loop structure that may be a pre-determined structure of a known network motif. Control may pass to end.

Although the flowchart 700 is illustrated as discrete operations, such as 702, 704, 706, and 708. However, in certain embodiments, such discrete operations may be further divided into additional operations, combined into fewer operations, or eliminated, depending on the particular implementation without detracting from the essence of the disclosed embodiments.

Figure 8:
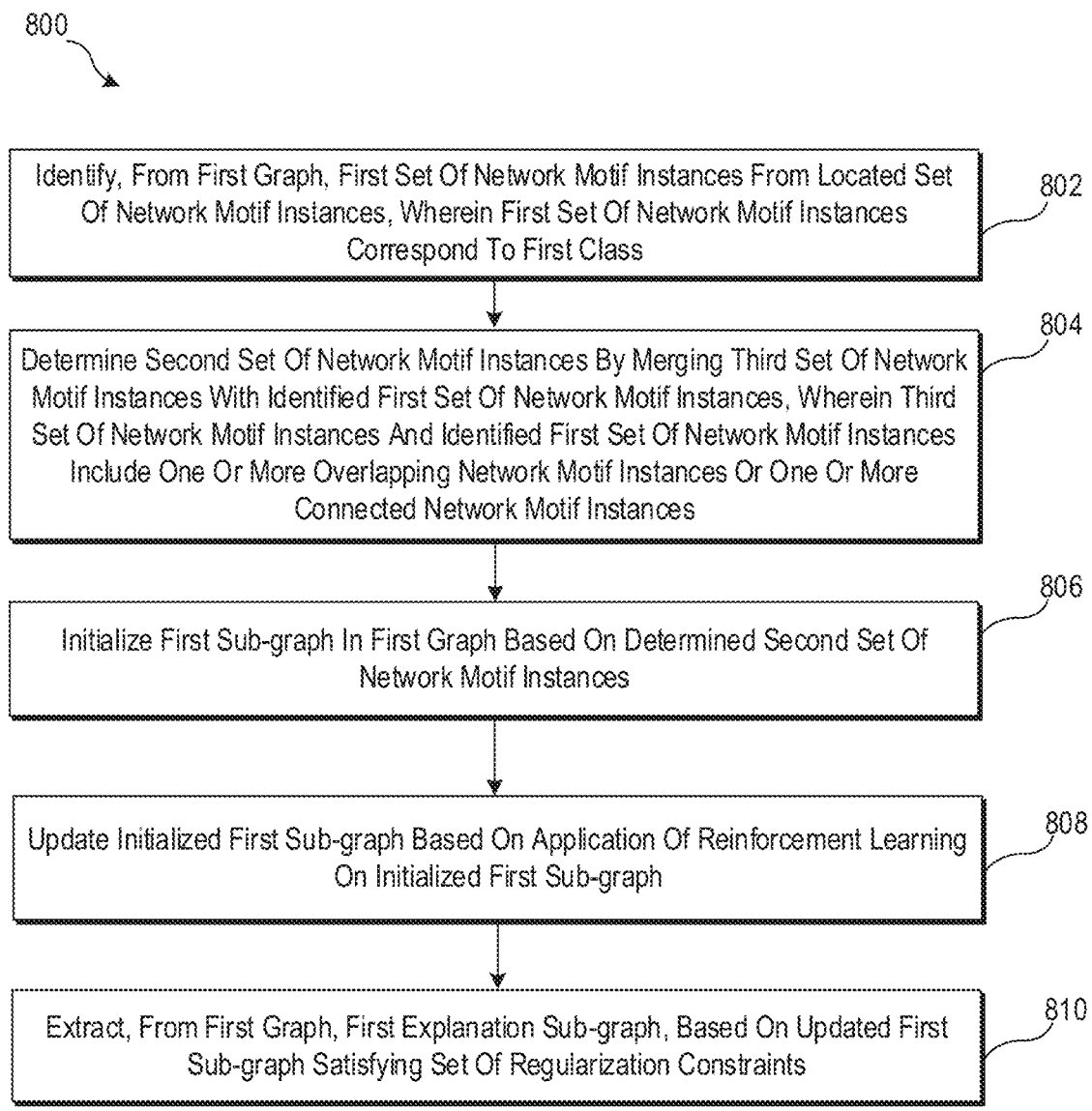
FIG. 8 is a diagram that illustrates a flowchart of an example method for extraction of a first explanation sub-graph from a first graph associated with a biological domain.

FIG. 8 is a diagram that illustrates a flowchart of an example method for extraction of a first explanation sub-graph from a first graph associated with a biological domain, arranged in accordance with at least one embodiment described in the present disclosure. FIG. 8 is explained in conjunction with elements from FIG. 1, FIG. 2, FIG. 3A, FIG. 3B, FIG. 4, FIG. 5, FIG. 6, and FIG. 7. With reference to FIG. 8, there is shown a flowchart 800. The method illustrated in the flowchart 800 may start at 802 and may be performed by any suitable system, apparatus, or device, such as by the example electronic device 102 of FIG. 1 or processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, a first set of network motif instances may be identified from the located set of network motif instances from the first graph 300A. In an embodiment, the processor 204 may be configured to identify, from the first graph 300A, the first set of network motif instances from the located set of network motif instances. The first set of network motif instances may correspond to the first class associated with the first graph 300A. To identify the first set of network motif instances, the processor 204 may determine a correlation score of each of the set of network motifs for the first class associated with the first graph 300A, based on a graph-based prediction task executed on the first graph 300A. The processor 204 may use the equation (2), as mentioned in FIG. 7, to determine the correlation score. The first set of network motif instances may be identified based on the correlation score of corresponding network motifs for the first class being above a certain threshold.

At block 804, a second set of network motif instances may be determined by merging a third set of network motif instances with the identified first set of network motif instances. In an embodiment, the processor 204 may be configured to determine the second set of network motif instances by merging the third set of network motif instance with the identified first set of network motif instances. Herein, the third set of network motif instances and the identified first set of network motif instances may include one or more overlapping network motif instances or one or more connected network motif instances. The processor 204 may identify the one or more network motif instances that may be overlapping or connected to one or more of the identified first set of network motif instances in the first graph 300A. Such identified one or more overlapping or connected network motif instances (i.e. described further in FIG. 10A) may be labeled as the third set of network motif instances. The labeled third set of network motif instances may then be merged with the identified first set of network motif instances to determine the second set of network motif instances.

At block 806, a first sub-graph in the first graph 300A may be initialized based on the determined second set of network motif instances. In an embodiment, the processor 204 may be configured to initialize the first sub-graph in the first graph 300A based on the determined second set of network motif instances. The processor 204 may initialize a sub-graph including the second set of network motif instances as the first sub-graph to search and extract the first explanation sub-graph from the first graph 300A. Thus, based on a prior knowledge of overlapping and connected network motif instances (e.g., the second set of network motif instances) in the first graph 300A, a search space for the extraction of the first explanation sub-graph from the first graph 300A may be reduced. This may improve an efficiency and accuracy of extraction of the first explanation sub-graph from the first graph 300A and also reduce a time required to extract the first explanation sub-graph.

At block 808, the initialized first sub-graph may be updated based on an application of reinforcement learning on the initialized first sub-graph. In an embodiment, the processor 204 may be configured to update the initialized first sub-graph based on the application of reinforcement learning on the initialized first sub-graph. The update of the initialized first sub-graph based on the application of reinforcement learning is described further, for example, in FIGS. 9, 11, and 12.

At block 810, the first explanation sub-graph may be extracted from the first graph 300A based on the updated first sub-graph satisfying the set of regularization constraints. In an embodiment, the processor 204 may be configured to extract the first explanation sub-graph from the first graph 300A based on the updated first sub-graph satisfying the set of regularization constraints. Examples of the set of regularization constraints may include one or more of, but not limited to, a prediction score constraint, a size constraint, or a connectedness constraint. The prediction score constraint may be a threshold prediction score for an output of the graph explanation model 206B for a corresponding updated sub-graph to be assigned as the first explanation sub-graph. The size constraint may be a constraint that may limit a size (e.g., in terms of number of nodes) of the updated sub-graph to be assigned as the first explanation sub-graph. The connectedness constraint may be a constraint that may require the updated sub-graph to have connectivity between nodes for the updated sub-graph to be assigned as the first explanation sub-graph. The extraction of the first explanation sub-graph is described further, for example, in FIGS. 11 and 12. Control may pass to end.

Although the flowchart 800 is illustrated as discrete operations, such as 802, 804, 806, 808, and 810. However, in certain embodiments, such discrete operations may be further divided into additional operations, combined into fewer operations, or eliminated, depending on the particular implementation without detracting from the essence of the disclosed embodiments.

Figure 9:
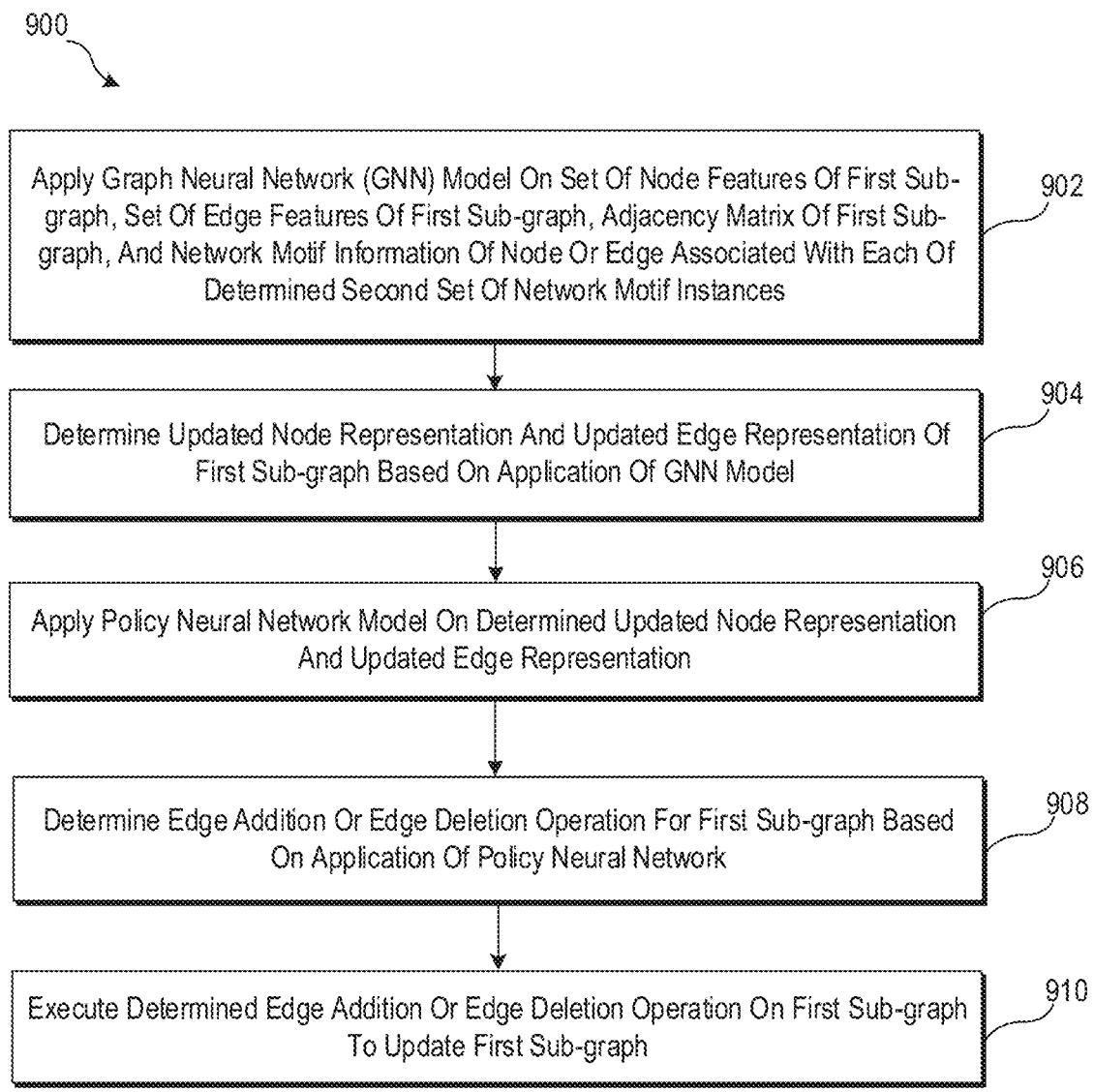
FIG. 9 is a diagram that illustrates a flowchart of an example method for update of an initialized first sub-graph of a first graph associated with a biological domain using reinforcement learning.

FIG. 9 is a diagram that illustrates a flowchart of an example method for update of an initialized first sub-graph of a first graph associated with a biological domain using reinforcement learning, arranged in accordance with at least one embodiment described in the present disclosure. FIG. 9 is explained in conjunction with elements from FIG. 1, FIG. 2, FIG. 3A, FIG. 3B, FIG. 4, FIG. 5, FIG. 6, FIG. 7, and FIG. 8. With reference to FIG. 9, there is shown a flowchart 900. The method illustrated in the flowchart 900 may start at 902 and may be performed by any suitable system, apparatus, or device, such as by the example electronic device 102 of FIG. 1 or processor 204 of FIG. 2. Although illustrated with discrete blocks, the steps and operations associated with one or more of the blocks of the flowchart 900 may be divided into additional blocks, combined into fewer blocks, or eliminated, depending on the particular implementation.

At block 902, a graph neural network (GNN) model may be applied on a set of node features of the first sub-graph, a set of edge features of the first sub-graph, an adjacency matrix of the first sub-graph, and the network motif information of a node or an edge associated with each of the determined second set of network motif instances. In an embodiment, the processor 204 may be configured to apply the GNN model on the set of node features, the set of edge features, and the adjacency matrix associated with the first sub-graph. The GNN model may be further applied on the network motif information of a node or an edge associated with each of the determined second set of network motif instances (i.e. determined at 804 of FIG. 8). The network motif information may include features from each of the determined second set of network motif instances with higher order patterns, such as, a type of network motif involved with the node or edge, and a position of the node or edge in the network motif instance. For example, the type of network motif may be a feed-forward loop network motif, such as, the first network motif 300B. The position of the node or edge may be a location of the node or the edge within the network motif instance, with respect to a reference node or edge in the network motif instance.

At 904, an updated node representation and an updated edge representation of the first sub-graph may be determined based on the application of the GNN model. In an embodiment, the processor 204 may determine the updated node representation and the updated edge representation of the first sub-graph based on the application of the GNN model. The processor 204 may encode the various inputs (e.g., the set of features of the edges and nodes, the adjacency matrix, and the network motif information associated with the second set of network motif instances) applied to the GNN model to generate a feature vector associated with the GNN model. After the encoding, information may be passed between a node and its neighboring nodes connected through edges in the first sub-graph. Based on the information passed to the neighboring nodes, a final vector may be generated for each node and/or each edge. Such final vector may include information associated with the set of features for the particular node, the particular edge, as well as the neighboring nodes, thereby provide reliable and accurate information associated with the particular node and/or particular edge. The processor 204 may determine the updated node representation and the updated edge representation of the first sub-graph based on the generated final vector.

At block 906, a policy neural network model may be applied on the determined updated node representation and the updated edge representation. In an embodiment, the processor 204 may be configured to apply the policy neural network model on the updated node representation and the updated edge representation of the first sub-graph. In an embodiment, a determination of an edge addition or edge deletion operation may be based on a correlation score of the network motif for the first class. In an embodiment, the policy neural network may apply a policy that may maximize a probability of selection of edges of the first sub-graph that may be part of network motifs instances whose correlation scores for the first class may be above a certain threshold. In other words, the policy neural network may be trained to select those edges of a graph or sub-graph that may be a part of network motif instances with higher correlation score for a certain class.

At block 908, an edge addition or edge deletion operation may be determined for the first sub-graph based on the application of the policy neural network. In an embodiment, the processor 204 may be configured to determine an edge addition or an edge deletion operation for the first sub-graph based on the application of the policy neural network. The processor 204 may determine a first matrix corresponding to the adjacency matrix of the first sub-graph as an output of the policy neural network. The first matrix may be of the same size as the adjacency matrix of the first sub-graph and may correspond to an updated version of the adjacency matrix. The processor 204 may compare the first matrix with the adjacency matrix to determine the edge addition or edge deletion operation as further described, for example, in FIG. 11.

At block 910, the determined edge addition or edge deletion operation may be executed on the first sub-graph to update the first sub-graph. In an embodiment, the processor 204 may be configured to execute the determined edge addition or edge deletion operation on the first sub-graph to update the first sub-graph. The processor 204 may add or delete an edge in the first sub-graph according to the comparison between the first matrix and the adjacency matrix. The processor 204 may iteratively update the first sub-graph till the updated first sub-graph satisfies the set of regularization constraints. The processor 204 may assign such updated first sub-graph satisfying the set of regularization constraints as the first explanation sub-graph. Control may pass to end.

Although the flowchart 900 is illustrated as discrete operations, such as 902, 904, 906, 909, and 910. However, in certain embodiments, such discrete operations may be further divided into additional operations, combined into fewer operations, or eliminated, depending on the particular implementation without detracting from the essence of the disclosed embodiments.

FIGS. 10A and 10B are diagrams that illustrate example first graphs from which explanation sub-graphs are extracted using network motif analysis, arranged in accordance with at least one embodiment described in the present disclosure. FIGS. 10A and 10B are explained in conjunction with elements from FIG. 1, FIG. 2, FIG. 3A, FIG. 3B, FIG. 4, FIG. 5, FIG. 6, FIG. 7, FIG. 8, and FIG. 9.

With reference to FIG. 10A, there is shown an example first graph 1000A. The first graph 1000A may include a network motif instance of a network motif 1002. In FIG. 10A, there is further shown a first explanation sub-graph 1004 of the first graph 1000A. In an embodiment, the processor 204 may start an extraction of the first explanation sub-graph 1004 from the network motif instance of the network motif 1002 located in the first graph 1000A. This may reduce a search space in the first graph 1000A that may be required to be explored by the processor 204 to search and extract the first explanation sub-graph 1004. For example, if the first graph 1000A is of a biological domain, the processor 204 may merge overlapping or connected network motif instances to determine a sub-graph. The processor 204 may then add or remove edges to the sub-graph based on reinforcement learning to determine the first explanation sub-graph 1004 from the sub-graph, as described in FIGS. 8, 9, 11 and 12. In another example, if the first graph 1000A is of a social networking domain, based on the set of regularization constraints, the processor 204 may maximize a likelihood of an inclusion of a sub-graph in the first explanation sub-graph 1004, in case such network motifs have correlation scores for the first class above a threshold. The sub-graph may be included in the first explanation sub-graph 1004 based on an average correlation score of a set of edges in the sub-graph for the first class. Herein, a correlation score of an edge may be based on a correlation score of an instance of a network motif for the first class. The extraction of the first explanation sub-graph 1004 based on an enhanced soft-mask based method is described further, for example, in FIG. 13. The extraction of the first explanation sub-graph 1004 based on an enhanced sampling based method is described further, for example, in FIGS. 14 and 15.

With reference to FIG. 10B, there is shown an example first graph 1000B. The first graph 1000B may include a set of network motif instances 1006. In an embodiment, the processor 204 may start an extraction of a first explanation sub-graph, in the first graph 1000B, from the set of network motif instances 1006 located in the first graph 1000B. Similar to the first graph 1000A, the start of the extraction of the first explanation sub-graph from the set of network motif instances 1006, instead of the complete first graph 1000B, may reduce a search space in the first graph 1000B that may be required to be explored to search and extract the first explanation sub-graph. In an example, in case the first graph 1000B is of a molecular domain, the reduction of the search space may correspond to a reduction of a probability of deletion of an edge involved in a network motif instance whose correlation score for the first class exceeds a threshold. The extraction of the first explanation sub-graph based on an enhanced Monte Carlo Tree Search method is described, for example, in FIG. 16. It may be noted that the first graph 1000A and the first graph 1000B shown in FIGS. 10A and 10B are presented merely as examples and should not be construed to limit the scope of the disclosure.

Figure 11:
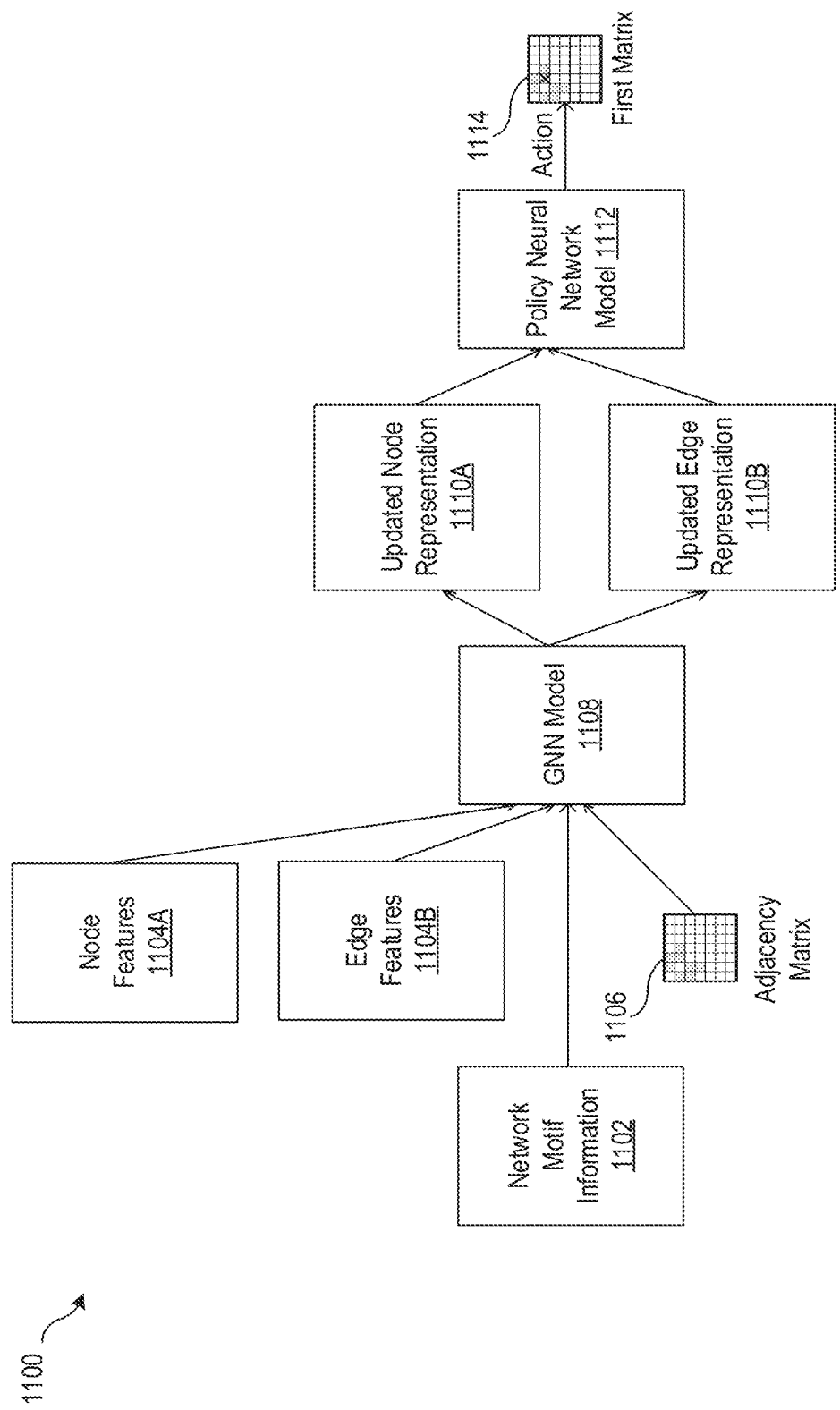
FIG. 11 is a diagram that illustrates an example scenario of update of an initialized first sub-graph of a first graph associated with a biological domain.

FIG. 11 is a diagram that illustrates an example scenario of update of an initialized first sub-graph of a first graph associated with a biological domain, arranged in accordance with at least one embodiment described in the present disclosure. FIG. 11 is explained in conjunction with elements from FIG. 1, FIG. 2, FIG. 3A, FIG. 3B, FIG. 4, FIG. 5, FIG. 6, FIG. 7, FIG. 8, FIG. 9, FIG. 10A, and FIG. 10B. With reference to FIG. 11, there is an example scenario 1100. The example scenario 1100 includes network motif information 1102, node features 1104A, edge features 1104B, adjacency matrix 1106, a Graph Neural Network (GNN) model 1108, an updated node representation 1110A, an updated edge representation 1110B, a policy neural network model 1112, and a first matrix 1114.

The network motif information 1102 may be associated with of a node or an edge associated with each of the determined second set of network motif instances in the initialized first sub-graph. For example, the network motif information 1102 may include features from each of the determined second set of network motif instances with higher order patterns, such as, but not limited to, a type of network motif involved with the node or edge, and a position of the node or edge in the network motif instance. For example, the type of network motif may be a feed-forward loop network motif, a single input module (SIM) network motif, or a dense overlapping regulons network motif. The position of the node or edge may be a location of the node or the edge within the network motif instance, with respect to a reference node or edge in the network motif instance. The node features 1104A, the edge features 1104B, and the adjacency matrix 1106 may be associated with the initialized first sub-graph. The processor 204 may apply the GNN model 1108 on the node features 1104A, the edge features 1104B, the adjacency matrix 1106, and the network motif information 1102.

In an embodiment, the processor 204 may determine the updated node representation 1110A and the updated edge representation 1110B of the first sub-graph based on the application of the GNN model 1108. The processor 204 may encode the various inputs applied to the GNN model 1108 to generate a feature vector associated with the GNN model 1108. After the encoding, information may be passed between a node and its neighboring nodes connected through edges in the first sub-graph. Based on the information passed to the neighboring nodes, a final vector may be generated for each node and/or each edge. Such final vector may include information associated with the set of features for the particular node, the particular edge, as well as the neighboring nodes, thereby providing reliable and accurate information associated with the particular node and/or particular edge. The processor 204 may determine the updated node representation 1110A and the updated edge representation 1110B of the first sub-graph based on the generated final vector.

In an embodiment, the processor 204 may be configured to apply the policy neural network model 1112 on the updated node representation 1110A and the updated edge representation 1110B of the first sub-graph. In an embodiment, a determination of an edge addition or edge deletion operation may be based on a correlation score of the network motif for the first class. In an embodiment, the policy neural network model 1112 may apply a policy that may maximize a probability of selection of edges of the first sub-graph that may be part of network motifs instances whose correlation scores for the first class may be above a certain threshold. In other words, the policy neural network model 1112 may be trained to select those edges of a graph or sub-graph that may be a part of network motif instances with higher correlation score for a certain class.

In an embodiment, the processor 204 may be configured to determine an action, such as, an edge addition or an edge deletion operation for the first sub-graph, based on the application of the policy neural network model 1112. The processor 204 may determine a first matrix 1114 corresponding to the adjacency matrix 1106 of the first sub-graph as an output of the policy neural network model 1112. The first matrix 1114 may be of the same size as the adjacency matrix 1106 of the first sub-graph and may correspond to an updated version of the adjacency matrix 1106. The processor 204 may compare the first matrix 1114 with the adjacency matrix 1106 to determine the edge addition or edge deletion operation. In an embodiment, the processor 204 may be configured to execute the determined edge addition or edge deletion operation on the first sub-graph to update the first sub-graph. The processor 204 may add or delete an edge in the first sub-graph according to the comparison between the first matrix 1114 and the adjacency matrix 1106. The processor 204 may iteratively update the first sub-graph till the updated first sub-graph satisfies the set of regularization constraints. The processor 204 may assign such updated first sub-graph satisfying the set of regularization constraints as the first explanation sub-graph. It may be noted that the scenario 1100 shown in FIG. 11 is presented merely as example and should not be construed to limit the scope of the disclosure.

Figure 12:
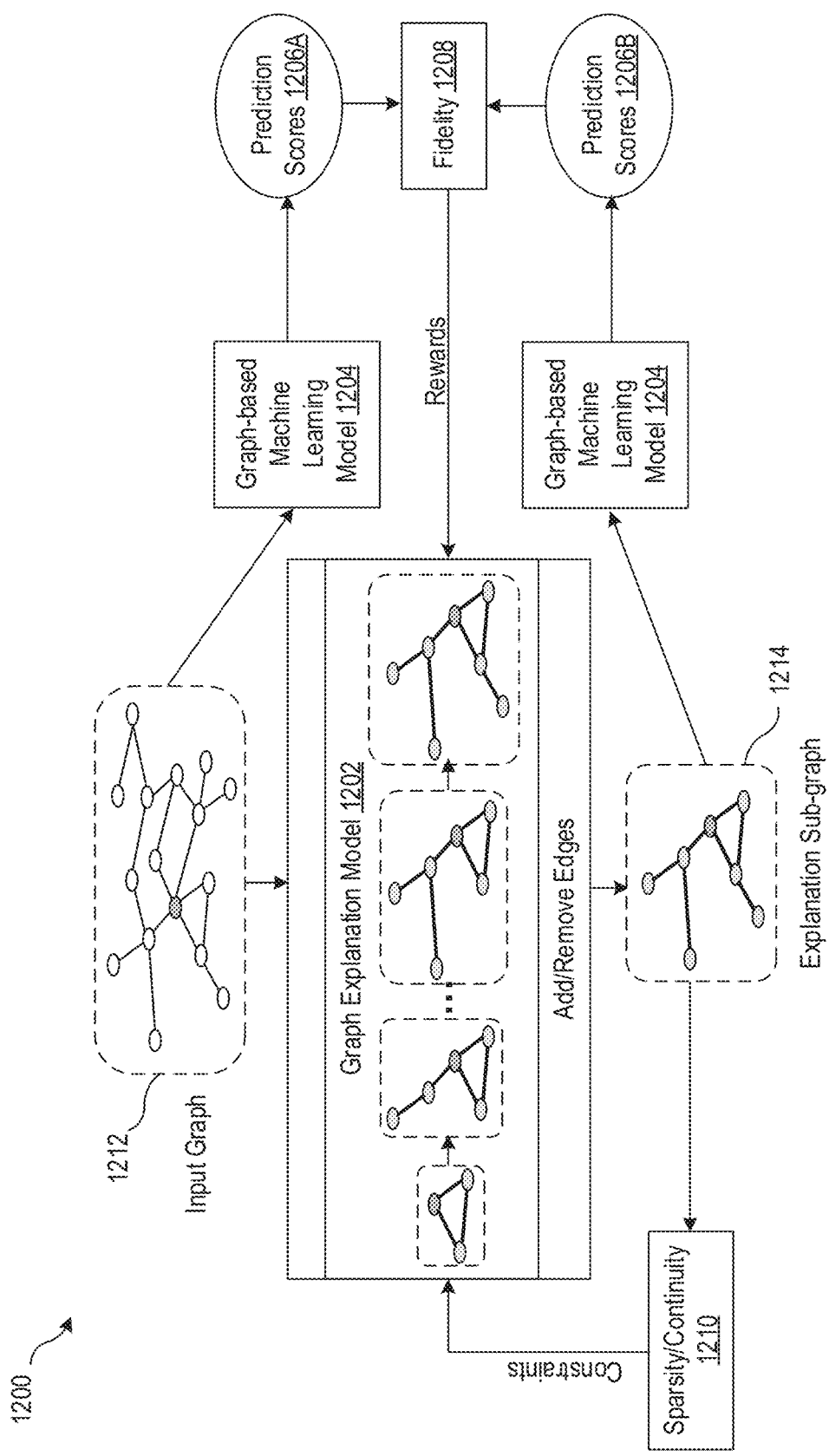
FIG. 12 is a diagram that illustrates an example scenario of extraction of an explanation sub-graph from an input graph.

FIG. 12 is a diagram that illustrates an example scenario of extraction of an explanation sub-graph from an input graph, arranged in accordance with at least one embodiment described in the present disclosure. FIG. 12 is explained in conjunction with elements from FIG. 1, FIG. 2, FIG. 3A, FIG. 3B, FIG. 4, FIG. 5, FIG. 6, FIG. 7, FIG. 8, FIG. 9, FIG. 10A, FIG. 10B, and FIG. 11. With reference to FIG. 12, there is an example scenario 1200. The example scenario 1200 includes a graph explanation model 1202, a graph-based machine learning model 1204 (e.g., a model to be explained), prediction scores 1206A, prediction scores 1206B, a fidelity 1208, a sparsity/continuity 1210, an input graph 1212, and an explanation sub-graph 1214.

The processor 204 may feed the input graph 1212 to the graph explanation model 1202. The processor 204 may initialize the first sub-graph from the input graph 1212 based on the determined second set of network motif instances, as described, for example, in FIG. 8 (at block 806). The graph explanation model 1202 may iteratively add or remove edges from the first sub-graph to update the first sub-graph, as described, for example, in FIGS. 9 and 11. The graph explanation model 1202 may assign the iteratively updated first sub-graph as the explanation sub-graph 1214. The processor 204 may feed each of the input graph 1212 and the explanation sub-graph 1214 to the graph-based machine learning model 1204. The graph-based machine learning model 1204 may execute a graph-based prediction task on the input graph 1212 to generate the prediction scores 1206A for classification of the input graph 1212 into one or more classes. Further, the graph-based machine learning model 1204 may execute the graph-based prediction task on the explanation sub-graph 1214 to generate the prediction scores 1206B for classification of the explanation sub-graph 1214 into the one or more classes. Thereafter, the processor 204 may compare the prediction scores 1206A with the prediction scores 1206B to determine the fidelity 1208. The fidelity 1208 may represent a closeness of the values of the prediction scores 1206A and the prediction scores 1206B and thereby may indicate an accuracy associated with the explanation sub-graph 1214 in the explanation of the input graph 1212 and its characteristics (e.g., its associated to the one or more classes). Based on the fidelity 1208, the processor 204 may maximize the prediction scores 1206B of the explanation sub-graph 1214 by passing suitable rewards (e.g., a bias term) associated with the reinforcement learning to the graph explanation model 1202.

The processor 204 may further determine the explanation sub-graph 1214 satisfying certain regularization constraints such as, the sparsity/continuity 1210. For example, to check for sparsity, the processor 204 may determine whether the explanation sub-graph 1214 is less than a certain threshold size in terms of number of nodes. Further, to check for continuity, the processor 204 may determine whether all nodes in the explanation sub-graph 1214 are connected to at least one more node in the explanation sub-graph 1214. Based on whether the explanation sub-graph 1214 satisfies the constraints such as, the sparsity/continuity 1210, the processor 204 may pass a constraints flag to the graph-based machine learning model 1204. The graph-based machine learning model 1204 may use the constraint flag to determine whether to continue the edge addition/deletion process (i.e., iterate again) or stop (i.e., assign the current first sub-graph as the final explanation sub-graph 1214). It may be noted that the scenario 1200 shown in FIG. 12 is presented merely as example and should not be construed to limit the scope of the disclosure.

Figure 13:
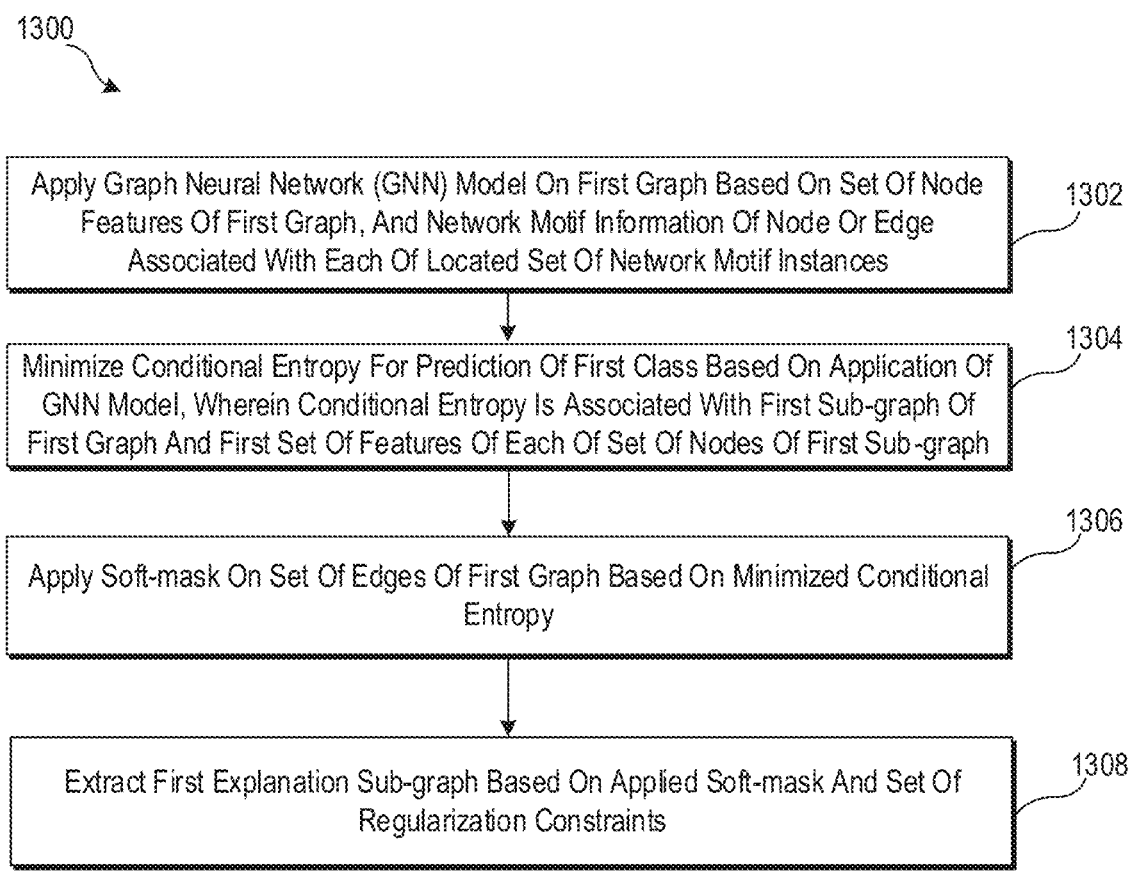
FIG. 13 is a diagram that illustrates a flowchart of an example method for extraction of a first explanation sub-graph from a first graph associated with a social networking domain.

FIG. 13 is a diagram that illustrates a flowchart of an example method for extraction of a first explanation sub-graph from a first graph associated with a social networking domain, arranged in accordance with at least one embodiment described in the present disclosure. FIG. 13 is explained in conjunction with elements from FIG. 1, FIG. 2, FIG. 3A, FIG. 3B, FIG. 4, FIG. 5, FIG. 6, FIG. 7, FIG. 8, FIG. 9, FIG. 10A, FIG. 10B, FIG. 11, and FIG. 12. With reference to FIG. 13, there is shown a flowchart 1300. The method illustrated in the flowchart 1300 may start at 1302 and may be performed by any suitable system, apparatus, or device, such as by the example electronic device 102 of FIG. 1 or processor 204 of FIG. 2. Although illustrated with discrete blocks, the steps and operations associated with one or more of the blocks of the flowchart 1300 may be divided into additional blocks, combined into fewer blocks, or eliminated, depending on the particular implementations.

At block 1302, a graph neural network (GNN) model may be applied on the first graph 300A based on a set of node features of the first graph 300A, and the network motif information of the node or the edge associated with each of the located set of network motif instances. In an embodiment, the processor 204 may apply the GNN model on the first graph 300A based on the set of node features of the first graph 300A, and the network motif information of the node or the edge associated with each of the located set of network motif instances. For example, the network motif information may include features from each of the located set of network motif instances with higher order patterns, such as, but not limited to, a type of network motif involved with the node or edge, and a position of the node or edge in the network motif instance. For example, the type of network motif may be a feed-forward loop network motif in case of the first network motif 300B. The position of the node or edge may be a location of the node or the edge within the network motif instance, with respect to a reference node or edge in the network motif instance.

At block 1304, a conditional entropy for a prediction of the first class may be minimized based on the application of the GNN model. In an embodiment, the processor 204 may be configured to minimize the conditional entropy for prediction of the first class based on the application of the GNN model. The conditional entropy may be associated with a first sub-graph (e.g., $G_S$) of the first graph 300A (e.g., $G_C$, where $G_S \subseteq G_C$) and a first set of features of each of a set of nodes of the first sub-graph. In an embodiment, the processor 204 may use a fractional adjacency matrix for the first sub-graph (i.e., $G_S$), i.e., $A_S \in [0,1]^{n \times n}$ (where $G_C$ includes n nodes) and enforces a sub-graph constraint as $A_S[j, k] \leq A_C[j, k]$ for all j and k (where $A_C$ is the adjacency matrix for $G_C$). The processor 204 may assign $G_S$ to a random graph variable, G. An objective function including the conditional entropy to be minimized may be represented by the following expression (3):

$$\min_G E_{G_S \sim G} H(Y|G=G_S, X=X_S) \qquad (3)$$

where,

E may represent an expectation value;

H(.) may represent entropy;

Y may represent predicted class label; and $X_S$ may represent a subset of node features of the nodes in $G_S$ ($X_S$ may also include the network motif information of the nodes in $G_S$).

In an embodiment, the processor 204 may apply a Jensen's inequality based on a convexity assumption, which may provide the following upper bound for the objective function of the conditional entropy, as represented in expression (4):

$$\min_G H(Y|G=E_G[G_S], X=X_S) \qquad (4)$$

The minimization of the objective function of expression (4) may lead to a local minima that may provide accurate explanation sub-graph.

At block 1306, a soft-mask may be applied on a set of edges of the first graph 300A based on the minimized conditional entropy. In an embodiment, the processor 204 may apply the soft-mask on the set of edges of the first graph 300A based on the minimized conditional entropy. In an embodiment, the processor 204 may estimate $E_G$ using a mean-field variation approximation to decompose the random graph variable, G, into a multivariate Bernoulli distribution ($P_G(G_S)$) that may be represented by the following equation (5):

$$P_G(G_s) = \prod_{(j,k) \in G_C} A_S[j,k] \quad (5)$$

The processor 204 may use the equation (5) to estimate an expectation for the mean-field approximation. Based on the estimated expectation, the processor 204 may determine $A_S$ such that the $(j, k)^{th}$ record in $A_S$ may represent an expectation of existence or presence of an edge ($v_j$, $v_k$) in the sub-graph $G_S$. The processor 204 may apply the soft-mask by masking the adjacency matrix $A_C$ of the first graph 300A ($G_C$) with a sigmoid function (σ) applied to a mask (M) to be learned. The soft-mask may be represented by the following expression (6):

$$A_C \odot \sigma(M) \quad (6)$$

where,
⊙ may represent element-wise multiplication operator;
σ(.) may represent a sigmoid function that may map the mask M to $[0,1]^{n \times n}$; and M may represent the mask to be learned through the optimization, where $M \in \mathbb{R}^{n \times n}$.

At block 1308, the first explanation sub-graph may be extracted from the based on the applied soft-mask and the set of regularization constraints. In an embodiment, the processor 204 may be configured to extract the first explanation sub-graph from the first graph 300A ($G_C$) based on the applied soft-mask (as per expression 6) and the set of regularization constraints. In an embodiment, the processor 204 may optimize (i.e., minimize) the conditional entropy of expression (4) by replacing $E_G[G_S]$ with the soft-mask, as per expression (6). Based on the optimization, the mask may be learned and used to determine the first explanation sub-graph. In an embodiment, the processor 204 may apply a gradient descent method to minimize the conditional entropy of expression (4), after the replacement of $E_G[G_S]$ with the soft-mask term.

In an embodiment, the processor 204 may apply the set of regularization constraints for the minimization of the conditional entropy to achieve a faster convergence. Examples of the set of regularization constraints may include one or more of, but not limited to, a prediction score constraint, a size constraint, or a connectedness constraint. In an embodiment, the set of regularization constraints may maximize a likelihood of an inclusion of a sub-graph in the first explanation sub-graph such that the sub-graph includes one or more overlapped network motifs. Herein, correlation scores of each of the one or more overlapped network motifs for the first class may exceed a threshold. Further, the sub-graph may be included in the first explanation sub-graph based on an average correlation score of a set of edges in the sub-graph for the first class. Herein, a correlation score of an edge may be based on a correlation score of a network motif for the first class. Control may pass to end.

Although the flowchart 1300 is illustrated as discrete operations, such as 1302, 1304, 1306, and 1308. However, in certain embodiments, such discrete operations may be further divided into additional operations, combined into fewer operations, or eliminated, depending on the particular implementation without detracting from the essence of the disclosed embodiments.

Figure 14:
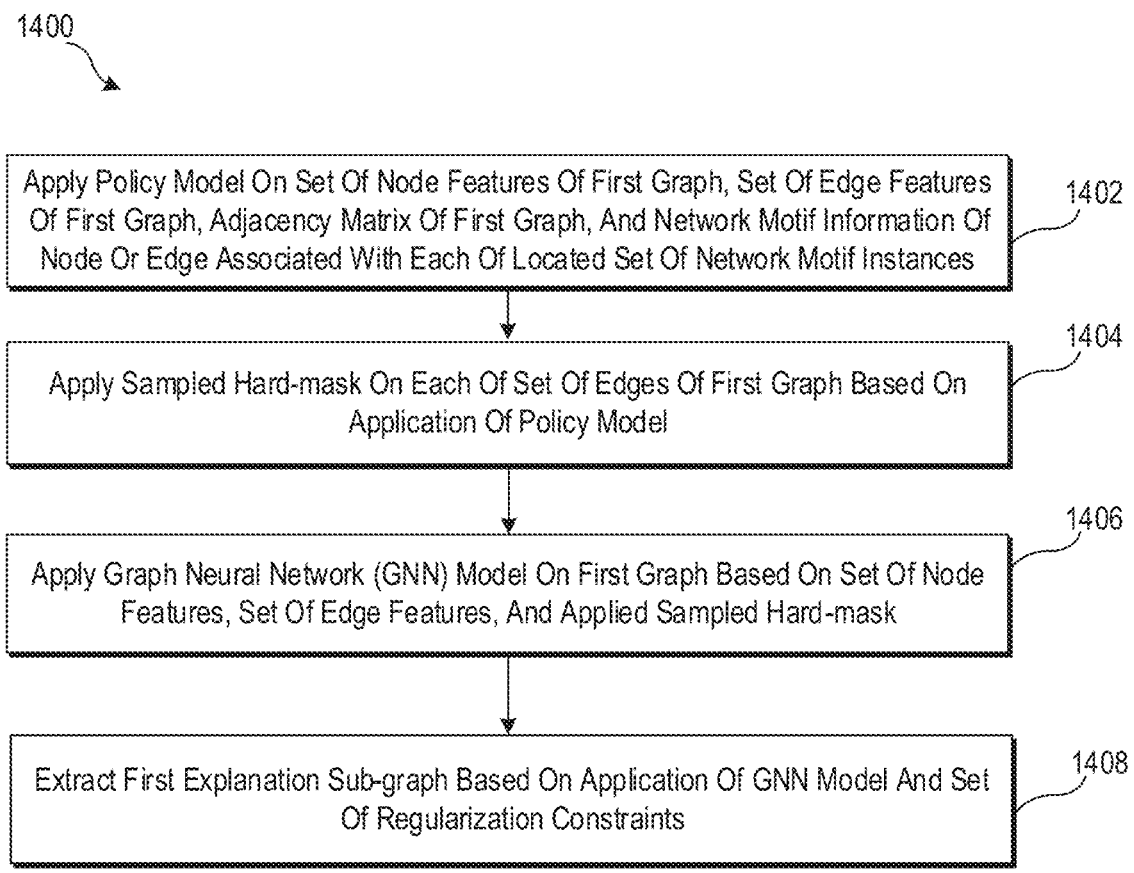
FIG. 14 is a diagram that illustrates a flowchart of another example method for extraction of a first explanation sub-graph from a first graph associated with a social networking domain.

FIG. 14 is a diagram that illustrates a flowchart of another example method for extraction of a first explanation sub-graph from a first graph associated with a social networking domain, arranged in accordance with at least one embodiment described in the present disclosure. FIG. 14 is explained in conjunction with elements from FIG. 1, FIG. 2, FIG. 3A, FIG. 3B, FIG. 4, FIG. 5, FIG. 6, FIG. 7, FIG. 8, FIG. 9, FIG. 10A, FIG. 10B, FIG. 11, FIG. 12, and FIG. 13. With reference to FIG. 14, there is shown a flowchart 1400. The method illustrated in the flowchart 1400 may start at 1402 and may be performed by any suitable system, apparatus, or device, such as by the example electronic device 102 of FIG. 1 or processor 204 of FIG. 2. Although illustrated with discrete blocks, the steps and operations associated with one or more of the blocks of the flowchart 1400 may be divided into additional blocks, combined into fewer blocks, or eliminated, depending on the particular implementations.

At block 1402, a policy model may be applied on a set of node features of the first graph 300A, a set of edge features of the first graph 300A, an adjacency matrix of the first graph 300A, and the network motif information of the node or the edge associated with each of the located set of network motif instances. In an embodiment, the processor 204 may be configured to apply the policy model on the set of node features, the set of edge features, and the adjacency matrix associated with the first graph 300A. The processor 204 may additionally apply the policy model on the network motif information of the node or the edge associated with each of the located set of network motif instances in the first graph 300A. For example, the network motif information may include features from each of the located set of network motif instances with higher order patterns, such as, but not limited to, a type of network motif involved with the node or edge, and a position of the node or edge in the network motif instance. For example, the type of network motif may be a feed-forward loop network motif in case of the first network motif 300B. The position of the node or edge may be a location of the node or the edge within the network motif instance, with respect to a reference node or edge in the network motif instance. Without higher-order information from the network motif instances as functional building blocks, the original features of nodes and edges in the first graph 300A may be limited and may lack of functional patterns. Further, without the network motif information, the processor 204 may not be able to effectively train the policy model to label hard-masks on a set of edges of the first graph 300A.

The policy model may correspond to one of, but not limited to, a reinforcement learning model or a variational auto-encoder (VAE) model. In case of the reinforcement learning model, a prediction score associated with a sub-graph extracted from the first graph 300A by the reinforcement learning model may be used as rewards for optimization of an output of the policy model, as described, for example, in FIGS. 11 and 12. In case of the VAE model, discrete latent variables may be formulated to optimize an output of the policy model. The discrete latent variables may use a difference between prediction scores associated with an extracted subgraph and the first graph 300A as an objective function for the optimization. In an embodiment, the application of the policy model may increase a probability of a selection in the first explanation sub-graph for an edge of a network motif instance whose correlation score for the first class exceeds a threshold. Thus, such an edge which may be included in a network motif instance whose correlation score for the first class exceeds the threshold may be selected through a sampled hard-mask, as described next.

At 1404, a sampled hard-mask may be applied on each of a set of edges of the first graph 300A based on the application of the policy model. In an embodiment, the processor 204 may be configured to apply the sampled hard-mask on each of the set of edges of the first graph 300A based on the application of the policy model. If "z" represents binary selections of the set of edges and "x" represents the set of edges of the first graph 300A, "(z, x)" may represent rationale that may be generated as (selections, input). To apply the sampled hard-mask, the processor 204 may use a generator function gen(x) as a probability distribution over binary selections, i.e., z ▯ gen(x)≡P(z|x), where the number of nodes in z varies with the number of nodes in the input x (i.e., the number of nodes in the first graph 300A).

The processor 204 may determine a target vector enc(z, x) for optimization by applying an encoder to the rationale as an input. The encoder may be a neural encoder trained on a training instance (x, y), where x={$x_t$}$_{t=1}^n$ (where n may correspond to n edges of the first graph 300A) and y∈[0, 1]$^m$ (where y may correspond to an m-dimensional output vector of the encoder for prediction of a class associated with the first graph 300A). The neural encoder may predict ŷ=enc(x). If trained on its own, the neural predictor may minimize a difference between the predicted output vector ŷ and a target output vector, y. The processor 204 may determine a squared error (e.g., an $L_2$ distance) as an output loss function (L(x, y)) for the output vector, y, as represented in the following equation (7):

$$L(x,y)=\|ŷ-y\|_2^2 \quad (7)$$

The processor 204 may enable the generator and the encoder to jointly learn to interact with each other, however, the generator and the encoder may be independently evaluated for modularity. The processor 204 may evaluate a joint loss function (L(z, x, y)) based on equation (7) as represented in the following equation (8):

$$L(z,x,y)=\|enc(z,x)-y\|_2^2 \quad (8)$$

The processor 204 may determine a cost function (cost (z, x, y)) as a combination of the joint loss function (L (z, x, y)) of equation (8) and a regularization term over the selections. The regularization term may include a first term that may restrict a number of selections and a second term that may restrict transitions (i.e., provides continuity to the selections). The processor 204 may then minimize an expected cost (as the selections may not be provided during the training) to apply the hard-mask on the set of edges of the first graph 300A. The processor 204 may use the following expression (9) to minimize the expected cost:

$$\min_{\theta_e,\theta_g} \sum_{(x,y)\in D} E_{z\widetilde{\boxtimes} gen(x)}[cost(z, x, y)] \quad (9)$$

where,
$\theta_e$ and $\theta_g$ may represent a set of parameters of the encoder and the generator, respectively; and
D may represent a collection of training instances.

In an embodiment, the processor 204 may generate the sampled hard-mask by a sampled approximation to a doubly stochastic gradient of the expected cost (in expression (9)). The processor 204 may sample a small number of rationales z from the generator gen(x) and then use a resulting average gradient in an overall stochastic gradient method. The processor 204 may similarly determine a sampled approximation to the gradient with respect to the set of encoder parameters ($\theta_e$).

At block 1406, a graph neural network (GNN) model may be applied on the first graph 300A based on the set of node features, the set of edge features, and the applied sampled hard-mask. In an embodiment, the processor 204 may apply the GNN model on the first graph 300A based on the set of node features of the first graph 300A, the set of edge features of the first graph 300A, and the applied sampled hard-mask. To apply the GNN model on the first graph 300A, the processor 204 may select edges from the first graph 300A based on the applied sampled hard-mask. The processor 204 may determine a first sub-graph of the first graph 300A based on the selected edges from the first graph 300A. The processor 204 may further apply the GNN model on the first sub-graph based on the set of node features of nodes associated with the selected edges and the set of edge features associated with the selected edges. The processor 204 may encode the various inputs (e.g., the set of features of the edges and nodes associated with the selected edges) applied to the GNN model to generate a feature vector associated with the GNN model. After the encoding, information may be passed between a node and its neighboring nodes connected through edges in the first sub-graph. Based on the information passed to the neighboring nodes, a final vector may be generated for each node and/or each edge. Such final vector may include information associated with the set of features for the particular node, the particular edge, as well as the neighboring nodes, thereby providing reliable and accurate information associated with the particular node and/or particular edge. The processor 204 may determine an updated node representation and an updated edge representation of the first sub-graph based on the generated final vector.

At 1408, the first explanation sub-graph may be extracted based on the application of the GNN model and the set of regularization constraints. In an embodiment, the processor 204 may extract the first explanation sub-graph based on the application of the GNN model and the set of regularization constraints. The processor 204 may extract the first explanation sub-graph based on the determined updated node representation and the updated edge representation of the first sub-graph. In an embodiment, the processor 204 may apply the set of regularization constraints for the optimization of the output of the policy model to achieve a faster convergence. Examples of the set of regularization constraints may include one or more of, but not limited to, a prediction score constraint, a size constraint, or a connectedness constraint. In an embodiment, the set of regularization constraints may maximize a likelihood of an inclusion of a sub-graph in the first explanation sub-graph such that the sub-graph includes one or more overlapped network motifs. Herein, correlation scores of each of the one or more overlapped network motifs for the first class may exceed a threshold. Further, the sub-graph may be included in the first explanation sub-graph based on an average correlation score of a set of edges in the sub-graph for the first class. Herein, a correlation score of an edge may be based on a correlation score of a network motif for the first class. The extraction of the explanation sub-graph from the first graph 300A associated with the social networking domain is described further, for example, in FIG. 15. Control may pass to end.

Although the flowchart 1400 is illustrated as discrete operations, such as 1402, 1404, 1406, and 1408. However, in certain embodiments, such discrete operations may be further divided into additional operations, combined into fewer operations, or eliminated, depending on the particular implementation without detracting from the essence of the disclosed embodiments.

Figure 15:
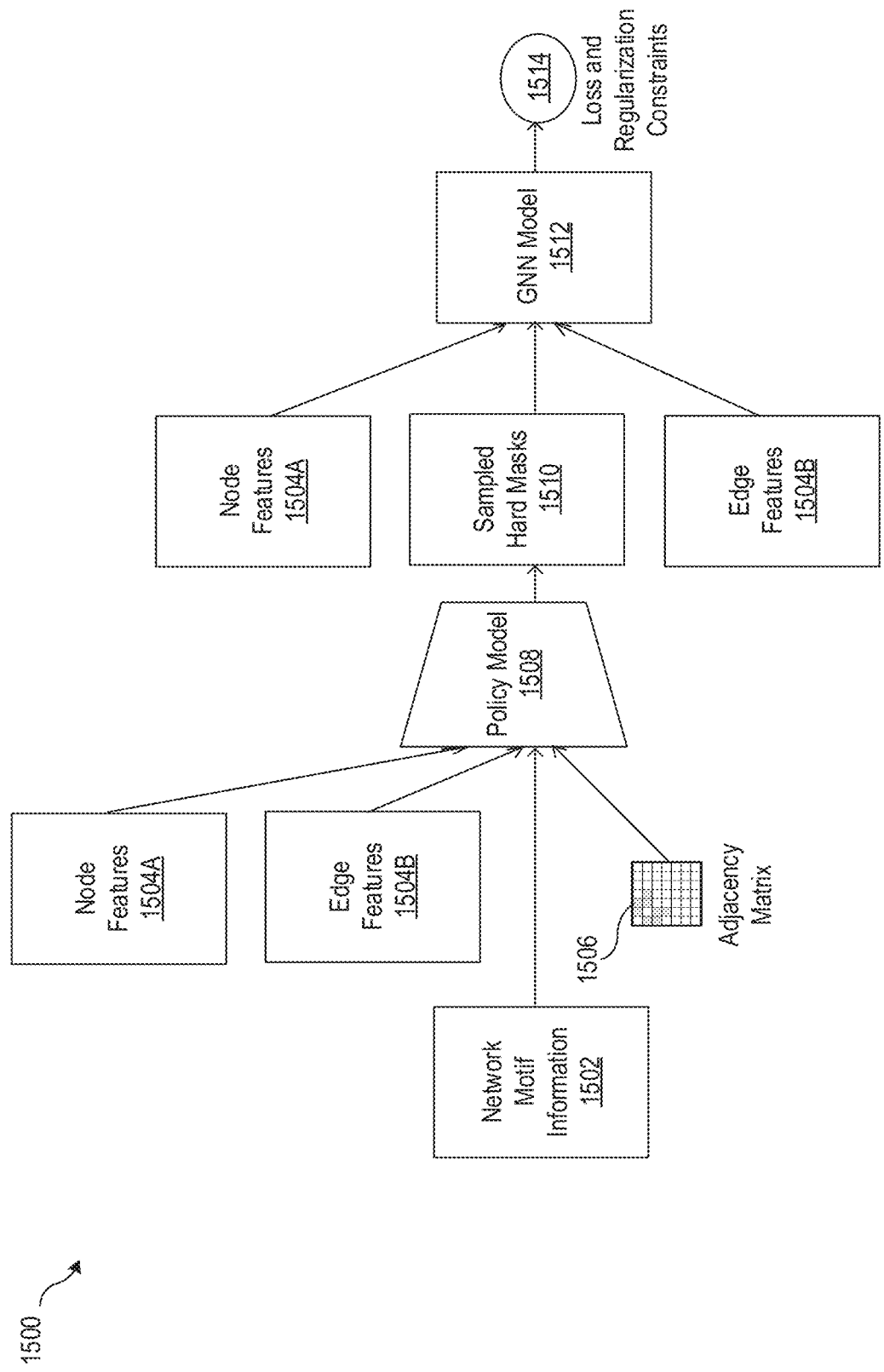
FIG. 15 is a diagram that illustrates an example scenario of extraction of a first explanation sub-graph from a first graph associated with a social networking domain.

FIG. 15 is a diagram that illustrates an example scenario of extraction of a first explanation sub-graph from a first graph associated with a social networking domain, arranged in accordance with at least one embodiment described in the present disclosure. FIG. 15 is explained in conjunction with elements from FIG. 1, FIG. 2, FIG. 3A, FIG. 3B, FIG. 4, FIG. 5, FIG. 6, FIG. 7, FIG. 8, FIG. 9, FIG. 10A, FIG. 10B, FIG. 11, FIG. 12, FIG. 13, and FIG. 14. With reference to FIG. 15, there is an example scenario 1500. The example scenario 1500 includes network motif information 1502, node features 1504A, edge features 1504B, an adjacency matrix 1506, a policy model 1508, sampled hard-masks 1510, a GNN model 1512, and loss and regularization constraints 1514.

The network motif information 1502 may be associated with of a node or an edge associated with each of the located set of network motif instances in the first graph 300A. For example, the network motif information 1502 may include features from each of the located set of network motif instances with higher order patterns, such as, but not limited to, a type of network motif involved with the node or edge, and a position of the node or edge in the network motif instance. For example, the type of network motif may be a feed-forward loop network motif, a single input module (SIM) network motif, or a dense overlapping regulons network motif. The position of the node or edge may be a location of the node or the edge within the network motif instance, with respect to a reference node or edge in the network motif instance. The node features 1504A, the edge features 1504B, and the adjacency matrix 1506 may be associated with the first graph 300A. The processor 204 may apply the policy model 1508 on the node features 1504A, the edge features 1504B, the adjacency matrix 1506, and the network motif information 1502.

In an embodiment, the processor 204 may determine the sampled hard-masks 1510, based on the application of the policy model 1508, as described further, for example, in FIG. 14 (at block 1404). The processor 204 may apply the determined sampled hard-masks 1510 on each of a set of edges of the first graph, based on the application of the policy model 1508. The processor 204 may select edges from the first graph 300A based on the application of the sampled hard-masks 1510 and determine a first sub-graph of the first graph 300A based on the selected edges from the first graph 300A. The processor 204 may apply the GNN model 1512 on the first sub-graph based on the set of node features (from the node features 1504A) of nodes associated with the selected edges and the set of edge features (from the edge features 1504B) associated with the selected edges. The processor 204 may encode the various inputs (e.g., the set of features of the edges and nodes associated with the selected edges) applied to the GNN model 1512 to generate a feature vector associated with the GNN model 1512. After the encoding, information may be passed between a node and its neighboring nodes connected through edges in the first sub-graph. Based on the information passed to the neighboring nodes, a final vector may be generated for each node and/or each edge. Such final vector may include information associated with the set of features for the particular node, the particular edge, as well as the neighboring nodes, thereby providing reliable and accurate information associated with the particular node and/or particular edge. The processor 204 may determine an updated node representation and an updated edge representation of the first sub-graph based on the generated final vector.

In an embodiment, the processor 204 may extract the first explanation sub-graph based on the application of the GNN model 1512 and the set of regularization constraints (e.g., the loss and regularization constraints 1514). The processor 204 may extract the first explanation sub-graph based on the determined updated node representation and the updated edge representation of the first sub-graph. In an embodiment, the processor 204 may apply the set of regularization constraints (e.g., the loss and regularization constraints 1514) for the optimization of the output of the policy model 1508 to achieve a faster convergence Examples of the loss and regularization constraints 1514 may include one or more of, but not limited to, a prediction score constraint (i.e., the loss), and size and connectedness constraints (i.e., the regularization constraints). In an embodiment, the loss and regularization constraints 1514 may maximize a likelihood of an inclusion of a sub-graph in the first explanation sub-graph such that the sub-graph includes one or more overlapped network motifs. Herein, correlation scores of each of the one or more overlapped network motifs for the first class may exceed a threshold. Further, the sub-graph may be included in the first explanation sub-graph based on an average correlation score of a set of edges in the sub-graph for the first class. Herein, a correlation score of an edge may be based on a correlation score of a network motif for the first class. The processor 204 may iteratively update the first sub-graph till the updated first sub-graph satisfies the loss and regularization constraints 1514. The processor 204 may assign such updated first sub-graph satisfying the loss and regularization constraints 1514 as the first explanation sub-graph. It may be noted that the scenario 1500 shown in FIG. 15 is presented merely as example and should not be construed to limit the scope of the disclosure.

Figure 16:
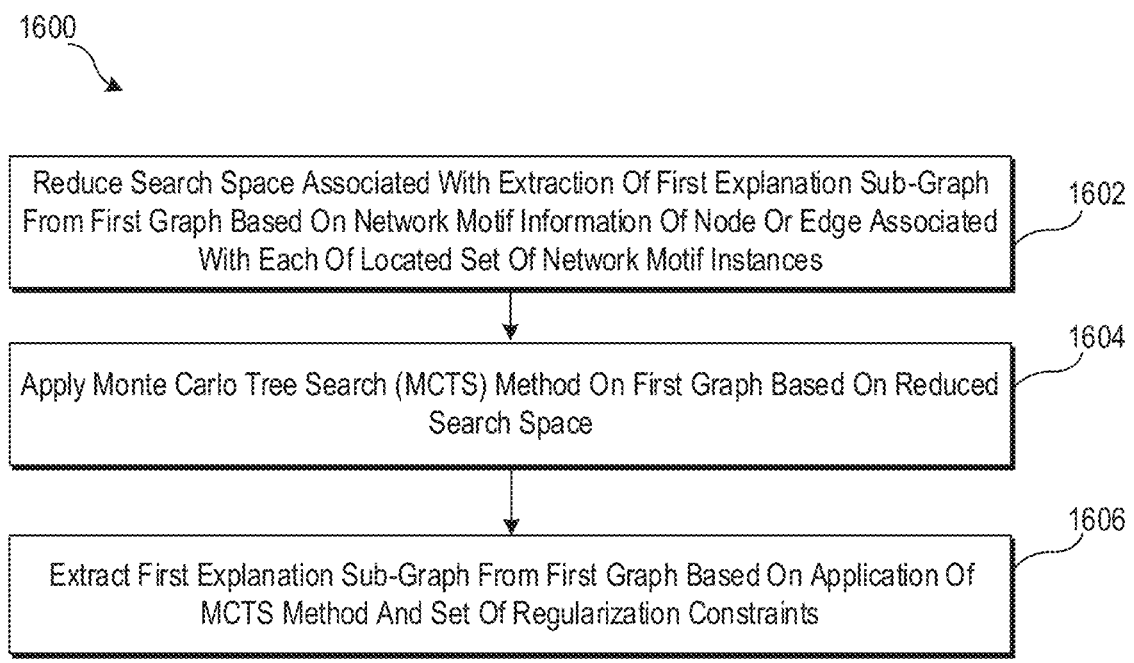
FIG. 16 is a diagram that illustrate a flowchart of an example method for extraction of a first explanation sub-graph from a first graph associated with a molecular domain.

FIG. 16 is a diagram that illustrate a flowchart of an example method for extraction of a first explanation sub-graph from a first graph associated with a molecular domain, arranged in accordance with at least one embodiment described in the present disclosure. FIG. 16 is explained in conjunction with elements from FIG. 1, FIG. 2, FIG. 3, FIG. 4, FIG. 5, FIG. 6, FIG. 7, FIG. 8A, FIG. 8B, FIG. 9, FIG. 10, FIG. 11, FIG. 12, FIG. 13, FIG. 14, and FIG. 15. With reference to FIG. 16, there is shown a flowchart 1600. The method illustrated in the flowchart 1600 may start at 1602 and may be performed by any suitable system, apparatus, or device, such as by the example electronic device 102 of FIG. 1 or processor 204 of FIG. 2. Although illustrated with discrete blocks, the steps and operations associated with one or more of the blocks of the flowchart 1600 may be divided into additional blocks, combined into fewer blocks, or eliminated, depending on the particular implementation.

At block 1602, a search space associated with the extraction of the first explanation sub-graph from the first graph 300A may be reduced based on the network motif information of the node or the edge associated with each of the located set of network motif instances in the first graph 300A. In an embodiment, the processor 204 may be configured to reduce the search space associated with the extraction of the first explanation sub-graph from the first graph 300A based on the network motif information of the node or the edge associated with each of the located set of network motif instances in the first graph 300A. In an embodiment, the reduction of the search space may correspond to a reduction of a probability of deletion of an edge involved in a network motif instance whose correlation score for the first class exceeds a threshold. For example, with reference to FIG. 10B, the processor 204 may reduce a probability of deletion of edges involved in the set of network motif instances 1006 in the first graph 1000B. This may reduce the search space required to be explored in the first graph 1000B for deletion of edges from the first graph 1000B to extract the first explanation sub-graph. The reduction in probability of deletion of the edges involved in the set of network motif instances 1006 may also enhance a probability of inclusion of such edges in the first explanation sub-graph of the first graph 1000B.

At block 1604, a Monte Carlo Tree Search (MCTS) method may be applied on the first graph 300A based on the reduced search space. In an embodiment, the processor 204 may be configured to apply the MCTS method on the first graph 300A based on the reduced search space. In an embodiment, the processor 204 may use a generative model by sampling a rationale S from a vocabulary $V_S^{[M]}$ of molecules M and completing it into a molecule represented by a molecular graph G. The generative model may be represented by the following equation (10):

$$P(G) = \sum_{S \in V_S^{[M]}} P(S) \cdot P(G|S) \qquad (10)$$

where,
P(.) may represent probability;
G may represent a molecular graph with nodes associated with atoms and edges associated with bonds between the atoms;
P(G|S) may represent a graph completion model; and
P(S) may represent a rationale distribution.

The processor 204 may construct the vocabulary $V_S^{[M]}$ based on combination of a rationale vocabulary of each individual property i (i.e., $V_S^i$). The processor 204 may determine the graph completion model (i.e., P(G|S)) to generate the molecular graph G using multi-property rationales $S^{[M]} \in V_S^{[M]}$. The processor 204 may pre-train the graph completion model (i.e., P(G|S)) on natural compounds and fine-tune the model based on a set of completion constraints. The processor 204 may execute a learning of the rationale distribution (i.e., P(S)) based on the properties of the molecule as expressed through the complete molecular graph G that may be generated from the graph completion model (i.e., P(G|S)). In an embodiment, the processor 204 may sample a rationale S based on a likelihood of expansion of the rationale into a positive molecule.

The processor 204 may determine a rationale $S^i$ based on iterative removal of one or more peripheral bonds (i.e., edges) from the molecular graph G and still maintaining the properties of the molecule. During such iterative removal, the processor 204 may explore the reduced search space from the molecular graph G. Thus, the time required to prune the molecule may be reduced due to reduction of the search space based on the network motif information. The processor 204 may then effectively solve the sampling search problem based on the MCTS method.

At block 1606, the first explanation sub-graph may be extracted from the first graph based on the application of the MCTS method and the set of regularization constraints. In an embodiment, the processor 204 may be configured to extract the first explanation sub-graph from the first graph 300A based on the application of the MCTS method and the set of regularization constraints. Examples of the set of regularization constraints may include one or more of, but not limited to, a prediction score constraint, a size constraint, or a connectedness constraint. For example, the size of $S^i$ may be required to be small (e.g., 20 nodes, i.e., 20 atoms). Further, a predicted property score (e.g., $r_i$) of the sampled molecule represented by the first explanation sub-graph may be required to be above a threshold. In addition, the sampled molecule may be required to be connected. Control may pass to end.

Although the flowchart 1600 is illustrated as discrete operations, such as 1602, 1604, and 1608. However, in certain embodiments, such discrete operations may be further divided into additional operations, combined into fewer operations, or eliminated, depending on the particular implementation without detracting from the essence of the disclosed embodiments.

FIGS. 17A, 17B, 17C, 17D, and 17E are diagrams that illustrate example scenarios of a display of an output representation indicative of an extracted first explanation sub-graph for a first class associated with a first graph, arranged in accordance with at least one embodiment described in the present disclosure. FIG. 15 is explained in conjunction with elements from FIG. 15 is explained in conjunction with elements from FIG. 1, FIG. 2, FIG. 3, FIG. 4, FIG. 5, FIG. 6, FIG. 7, FIG. 8A, FIG. 8B, FIG. 9, FIG. 10, FIG. 11, FIG. 12, FIG. 13, FIG. 14, FIG. 15, and FIG. 16.

Figure 17A:
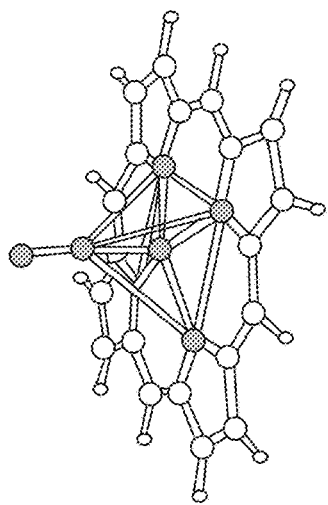
FIGS. 17A, 17B, 17C, 17D, and 17E are diagrams that illustrate example scenarios of a display of an output representation indicative of an extracted first explanation sub-graph for a first class associated with a first graph, all according to at least one embodiment described in the present disclosure.

With reference to FIG. 17A, there is shown an example scenario 1700A. The example scenario 1700A may include a first graph associated with a social networking domain. The processor 204 may extract a first explanation sub-graph from the first graph as described further, for example, in FIGS. 13, 14, and 15. The processor 204 may highlight the first explanation sub-graph for the first class associated with the first graph, as shown in FIG. 17A. The processor 204 may also highlight nodes and edges associated with network motif instances (i.e., different social network connection patterns) in the first explanation sub-graph. In an embodiment, the processor 204 may also highlight nodes and edges associated with network motif instances (i.e., different social network connection patterns) associated with different classes with different colors.

Figure 17C:
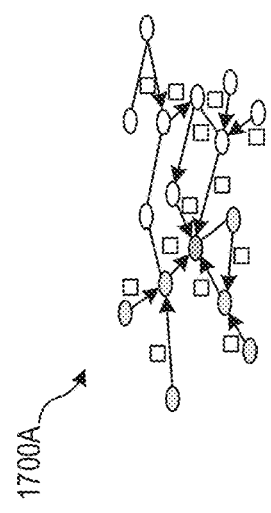
Figure 17B:
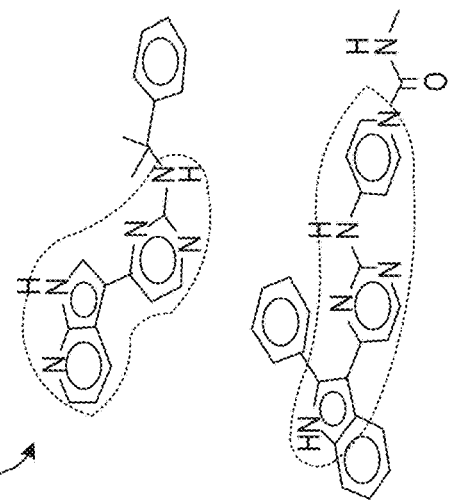

With reference to FIG. 17B, there is shown an example scenario 1700B. The example scenario 1700B may include a first graph associated with a molecular domain. The processor 204 may extract a first explanation sub-graph from the first graph as described further, for example, in FIG. 16. The processor 204 may highlight the first explanation sub-graph for the first class associated with the first graph. Herein, the first class may represent a certain property and the first explanation sub-graph may represent a molecule that may exhibit the property. The processor 204 may also highlight atoms (i.e., nodes) and bonds (i.e., edges) associated with network motif instances (i.e., molecular structures) in the molecule, as shown in FIG. 17B.

With reference to FIG. 17C, there is shown an example scenario 1700C. The example scenario 1700C may include a first graph associated with a biological domain, such as, a gene regulation network. The processor 204 may extract a first explanation sub-graph from the first graph as described further, for example, in FIGS. 8, 9, 11, and 12. The processor 204 may highlight the first explanation sub-graph for the first class associated with the first graph. The processor 204 may also highlight nodes and edges associated with network motif instances (i.e., different gene sequence patterns) in the first explanation sub-graph. In an embodiment, the processor 204 may also highlight nodes and edges associated with the network motif instances (i.e., different gene sequence patterns) associated with different classes with different colors.

Figure 17D:
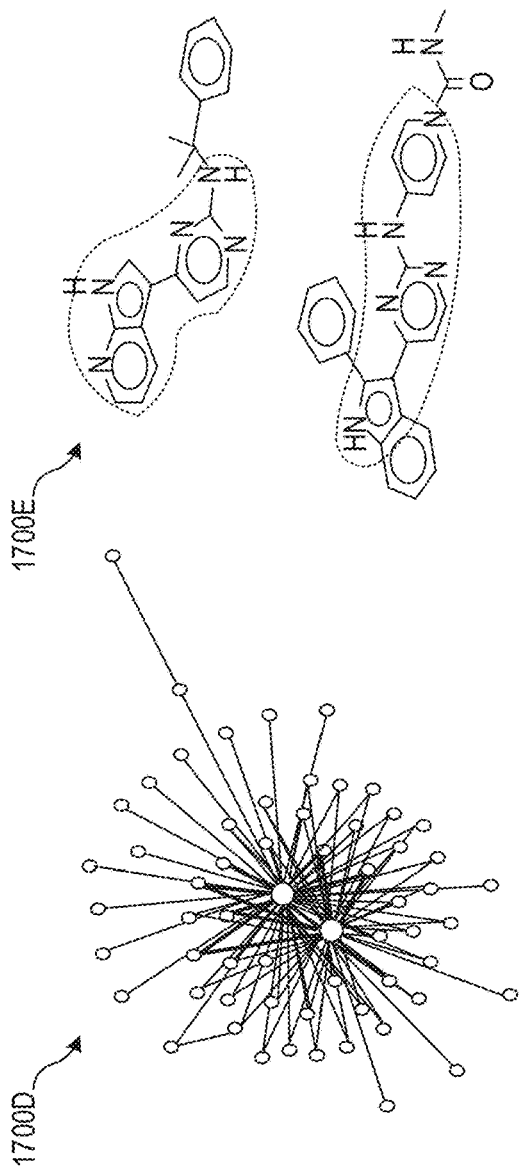

With reference to FIG. 17D, there is shown an example scenario 1700D. The example scenario 1700D may include a first graph associated with a question-answer network. The processor 204 may extract a first explanation sub-graph from the first graph as described further, for example, in FIGS. 13, 14, and 15. The processor 204 may highlight the first explanation sub-graph for the first class associated with the first graph, as shown in FIG. 17D. The processor 204 may also highlight nodes and edges associated with network motif instances (i.e., different question-answer chain patterns) in the first explanation sub-graph. In an embodiment, the processor 204 may also highlight nodes and edges associated with network motif instances (i.e., different question-answer chain patterns) associated with different classes with different colors.

Figure 17E:
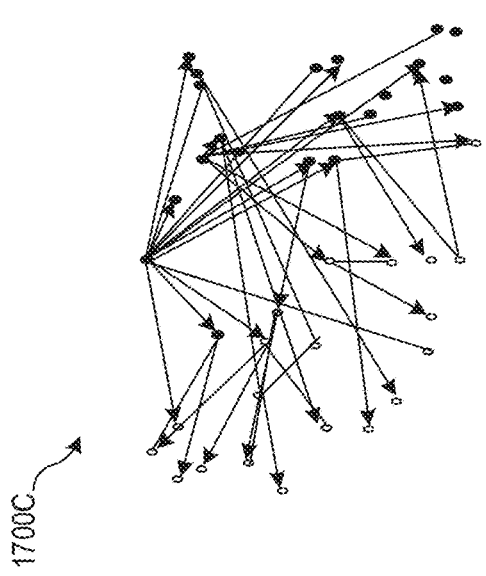

With reference to FIG. 17E, there is shown an example scenario 1700E. The example scenario 1700E may include a first graph associated with a molecular domain. The processor 204 may extract a first explanation sub-graph from the first graph as described further, for example, in FIG. 16. The processor 204 may highlight the first explanation sub-graph for the first class associated with the first graph. Herein, the first class may represent a certain property and the first explanation sub-graph may represent a molecule that may exhibit the property. The processor 204 may also highlight atoms (i.e., nodes) and bonds (i.e., edges) associated with network motif instances (i.e., molecular structures) in the molecule. In an embodiment, the processor 204 may also highlight atoms (i.e., nodes) and bonds (i.e., edges) associated with network motif instances (i.e., molecular structures) associated with different classes with different colors. It may be noted here that the scenarios 1700A, 1700B, 1700C, 1700D, and 1700E shown in FIGS. 17A, 17B, 17C, 17D, and 17E are merely presented as example and should not be construed to limit the scope of the disclosure.

The disclosed electronic device 102 may exploit network motifs in a graph for determination of an explanation sub-graph. In certain scenarios, instances of network motifs may be used for reducing search space in the graph for extraction of the explanation sub-graph. For example, based on a higher correlation score of certain network motif for a certain class associated with the graph, instances of the network motif in the graph may be used to extract the explanation sub-graph. Extraction of the explanation sub-graph based on such network motif instances may be a more accurate and efficient solution than convention solutions, which may use information of only node and edges in the graph. In another scenario in case the extraction of the explanation sub-graph involves pruning of nodes and edges from the graph, the instances of the network motif with the higher correlation score for the particular class may not be pruned. Instead, the disclosed electronic device 102 may include such instances of the network motif in the explanation sub-graph. Again, the search space in the graph that may be required to be explored to extract the explanation sub-graph may be reduced based on a location of such instances of the network motifs with a higher correlation score with respect to the target class of the graph. Further, the disclosed electronic device 102 may be able to automatically extract the explanation sub-graph from graphs of varied domains (such as, biological domain, social networking domain, and molecular domain), whereas conventional solutions may be capable to operate on graphs of only one particular domain and may require manual intervention.

Various embodiments of the disclosure may provide one or more non-transitory computer-readable storage media configured to store instructions that, in response to being executed, cause a system (such as, the example electronic device 102) to perform operations. The operations may include extracting a first set of sub-graphs from a first graph based on a set of hyper-parameters. The operations may further include extracting a set of network motifs from the first graph based on first statistical information associated with the extracted first set of sub-graphs. The operations may further include locating a set of network motif instances of each of the extracted set of network motifs in the first graph. The operations may further include determining second statistical information associated with each of the extracted set of network motifs based on the located set of network motif instances. The second statistical information may include network motif information of a node or an edge associated with each of the located set of network motif instances. The operations may further include applying a graph explanation model on the first graph based on the determined second statistical information. The operations may further include extracting, from the first graph, a first explanation sub-graph for a first class associated with the first graph, based on the application of the graph explanation model and a set of regularization constraints. The operations may further include displaying an output representation indicative of the extracted first explanation sub-graph for the first class associated with the first graph.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
   extracting a first set of sub-graphs from a first graph based on a set of hyper-parameters;
   extracting a set of network motifs from the first graph based on first statistical information associated with the extracted first set of sub-graphs;
   locating a set of network motif instances of each of the extracted set of network motifs in the first graph;
   determining second statistical information associated with each of the extracted set of network motifs based on the located set of network motif instances, the second statistical information includes network motif information of a node or an edge associated with each of the located set of network motif instances;
   applying a graph explanation model on the first graph based on the determined second statistical information;
   extracting, from the first graph, a first explanation sub-graph for a first class associated with the first graph, based on the application of the graph explanation model and a set of regularization constraints; and
   displaying an output representation indicative of the extracted first explanation sub-graph for the first class associated with the first graph.

2. The method according to claim 1, further comprising selecting, based on a user-input, the set of hyper-parameters.

3. The method according to claim 1, wherein the set of hyper-parameters comprises at least one of: a maximum number of nodes in a network motif, a node type constraint associated with the network motif, a count threshold associated with the network motif, or a statistical significance threshold associated with the network motif.

4. The method according to claim 1, further comprising:
   determining the first statistical information associated with the extracted first set of sub-graphs based on a count of the first set of sub-graphs extracted from the first graph;
   extracting a second set of sub-graphs from a random second graph, wherein a size of the random second graph is same as a size of the first graph;
   determining third statistical information associated with the extracted second set of sub-graphs based on a count of the second set of sub-graphs extracted from the random second graph; and
   extracting the set of network motifs from the first graph based on a comparison of the first statistical information and the third statistical information.

5. The method according to claim 4, wherein a first network motif of the set of network motifs is extracted from the first graph based on a condition including at least one of:
   a minimum count threshold for a network motif,
   a statistical significance for a presence the network motif in the first graph as compared to a presence of the network motif in the random second graph,
   a higher correlation score of the network motif for the first class associated with the first graph, or
   a similarity of the network motif to a pre-determined structure of a known network motif.

6. The method according to claim 1, wherein the set of regularization constraints comprises one or more of: a prediction score constraint, a size constraint, or a connectedness constraint.

7. The method according to claim 1, wherein the set of regularization constraints increases a likelihood of an inclusion of a sub-graph in the first explanation sub-graph, and wherein the sub-graph includes one or more overlapped network motifs whose correlation score for the first class exceeds a threshold.

8. The method according to claim 7, wherein the sub-graph is included in the first explanation sub-graph based on an average correlation score of a set of edges in the sub-graph for the first class, and wherein a correlation score of an edge is based on a correlation score of a network motif for the first class.

9. The method according to claim 1, wherein the network motif information includes at least one of: a type of a network motif instance associated with the node or the edge associated with the network motif instance, or a position of the node or the edge in the network motif instance.

10. The method according to claim 1, wherein a node type of a plurality of nodes in the first graph corresponds to a biological domain, and wherein the extraction of the first explanation sub-graph further comprises:
    identifying, from the first graph, a first set of network motif instances from the located set of network motif instances, wherein the first set of network motif instances correspond to the first class;
    determining a second set of network motif instances by merging a third set of network motif instances with the identified first set of network motif instances, wherein the third set of network motif instances and the identified first set of network motif instances include one or more overlapping network motif instances or one or more connected network motif instances;
    initializing a first sub-graph in the first graph based on the determined second set of network motif instances;
    updating the initialized first sub-graph based on an application of reinforcement learning on the initialized first sub-graph; and
    extracting, from the first graph, the first explanation sub-graph, based on the updated first sub-graph satisfying the set of regularization constraints.

11. The method according to claim 10, wherein the update of the initialized first sub-graph further comprises:
    applying a graph neural network (GNN) model on a set of node features of the first sub-graph, a set of edge features of the first sub-graph, an adjacency matrix of the first sub-graph, and the network motif information of a node or an edge associated with each of the determined second set of network motif instances;

determining an updated node representation and an updated edge representation of the first sub-graph based on the application of the GNN model;

applying a policy neural network model on the determined updated node representation and the updated edge representation;

determining an edge addition or edge deletion operation for the first sub-graph based on the application of the policy neural network; and executing the determined edge addition or edge deletion operation on the first sub-graph to update the first sub-graph.

12. The method according to claim 11, wherein the determination of the edge addition or edge deletion operation is based on a correlation score of a network motif for the first class.

13. The method according to claim 1, wherein a node type of a plurality of nodes in the first graph corresponds to a social networking domain, and wherein the extraction of the first explanation sub-graph further comprises:

applying a graph neural network (GNN) model on the first graph based on a set of node features of the first graph, and the network motif information of the node or the edge associated with each of the located set of network motif instances;

minimizing a conditional entropy for a prediction of the first class based on the application of the GNN model, wherein the conditional entropy is associated with a first sub-graph of the first graph and a first set of features of each of a set of nodes of the first sub-graph; and applying a soft-mask on a set of edges of the first graph based on the minimized conditional entropy; and extracting the first explanation sub-graph based on the applied soft-mask and the set of regularization constraints.

14. The method according to claim 1, wherein a node type of a plurality of nodes in the first graph corresponds to a social networking domain, and wherein the extraction of the first explanation sub-graph further comprises:

applying a policy model on a set of node features of the first graph, a set of edge features of the first graph, an adjacency matrix of the first graph, and the network motif information of the node or the edge associated with each of the located set of network motif instances;

applying a sampled hard-mask on each of a set of edges of the first graph based on the application of the policy model;

applying a graph neural network (GNN) model on the first graph based on the set of node features, the set of edge features, and the applied sampled hard-mask; and extracting the first explanation sub-graph based on the application of the GNN model and the set of regularization constraints.

15. The method according to claim 14, wherein the policy model corresponds to one of: a reinforcement learning model or a variational auto-encoder (VAE) model.

16. The method according to claim 14, wherein the application of the policy model increases a probability of a selection in the first explanation sub-graph for an edge of a network motif instance whose correlation score for the first class exceeds a threshold.

17. The method according to claim 1, wherein a node type of a plurality of nodes in the first graph corresponds to a molecular domain, and wherein the extraction of the first explanation sub-graph further comprises:

reducing a search space associated with the extraction of the first explanation sub-graph from the first graph based on the network motif information of the node or the edge associated with each of the located set of network motif instances;

applying a Monte Carlo Tree Search (MCTS) method on the first graph based on the reduced search space; and extracting the first explanation sub-graph from the first graph based on the application of the MCTS method and the set of regularization constraints.

18. The method according to claim 17, wherein the reduction of the search space corresponds to a reduction of a probability of deletion of an edge involved in a network motif instance whose correlation score for the first class exceeds a threshold.

19. One or more non-transitory computer-readable storage media configured to store instructions that, in response to being executed, cause an electronic device to perform operations, the operations comprising:

extracting a first set of sub-graphs from a first graph based on a set of hyper-parameters;

extracting a set of network motifs from the first graph based on first statistical information associated with the extracted first set of sub-graphs;

locating a set of network motif instances of each of the extracted set of network motifs in the first graph;

determining second statistical information associated with each of the extracted set of network motifs based on the located set of network motif instances, wherein the second statistical information includes network motif information of a node or an edge associated with each of the located set of network motif instances;

applying a graph explanation model on the first graph based on the determined second statistical information;

extracting, from the first graph, a first explanation sub-graph for a first class associated with the first graph, based on the application of the graph explanation model and a set of regularization constraints; and displaying an output representation indicative of the extracted first explanation sub-graph for the first class associated with the first graph.

20. An electronic device, comprising:
a memory storing instructions;
a processor, coupled to the memory, that executes the instructions to perform a process comprising:

extracting a first set of sub-graphs from a first graph based on a set of hyper-parameters;

extracting a set of network motifs from the first graph based on first statistical information associated with the extracted first set of sub-graphs;

locating a set of network motif instances of each of the extracted set of network motifs in the first graph;

determining second statistical information associated with each of the extracted set of network motifs based on the located set of network motif instances, the second statistical information includes network motif information of a node or an edge associated with each of the located set of network motif instances;

applying a graph explanation model on the first graph based on the determined second statistical information;

extracting, from the first graph, a first explanation sub-graph for a first class associated with the first graph, based on the application of the graph explanation model and a set of regularization constraints; and displaying an output representation indicative of the extracted first explanation sub-graph for the first class associated with the first graph.

* * * * *